(12) United States Patent
Kanehara et al.

(10) Patent No.: US 10,737,720 B2
(45) Date of Patent: Aug. 11, 2020

(54) LEANING VEHICLE

(71) Applicant: YAMAHA HATSUDOKI KABUSHIKI KAISHA, Iwata-shi, Shizuoka (JP)

(72) Inventors: Shuhei Kanehara, Iwata (JP); Tsunero Hamada, Iwata (JP); Shiro Nakada, Kyoto (JP)

(73) Assignee: YAMAHA HATSUDOKI KABUSHIKI KAISHA, Iwata-Shi, Shizouka (JP)

( * ) Notice: Subject to any disclaimer, the term of this patent is extended or adjusted under 35 U.S.C. 154(b) by 0 days.

(21) Appl. No.: 15/975,036

(22) Filed: May 9, 2018

(65) Prior Publication Data

US 2018/0257706 A1    Sep. 13, 2018

Related U.S. Application Data

(63) Continuation of application No. PCT/JP2016/083614, filed on Nov. 11, 2016.

(30) Foreign Application Priority Data

Nov. 13, 2015   (JP) ................................ 2015-223252

(51) Int. Cl.
    B62D 9/02       (2006.01)
    B62K 5/10       (2013.01)
    (Continued)

(52) U.S. Cl.
    CPC ................ B62D 9/02 (2013.01); B62K 5/027 (2013.01); B62K 5/05 (2013.01); B62K 5/08 (2013.01); B62K 5/10 (2013.01); B62K 21/18 (2013.01)

(58) Field of Classification Search
    CPC . B62L 1/005; F16D 55/28; F16H 1/20; F16H 21/44; G05G 5/00; G05G 5/05; G05G 5/12; G05G 5/16; G05G 5/22
    See application file for complete search history.

(56) References Cited

U.S. PATENT DOCUMENTS 7,487,985 B1    2/2009   Mighell
7,530,419 B2 *   5/2009   Brudeli ................ B60G 21/007
                                               180/210

(Continued)

FOREIGN PATENT DOCUMENTS

EP           3056417 A1    8/2016
JP         2007-099264 A    4/2007

(Continued)

*Primary Examiner* — Barry Gooden, Jr.
(74) *Attorney, Agent, or Firm* — Rabin & Berdo, P.C.

(57) ABSTRACT

A leaning vehicle includes a vehicle body; a rear wheel; a left arm mechanism; a left steerable front wheel; a right arm mechanism; a right steerable front wheel; a leaning mechanism; a leaning drive mechanism; and a steering mechanism. The leaning drive mechanism is disposed between any one of a left-right arm connection mechanism, the left arm mechanism and the right arm mechanism and the vehicle body. A rear end of the leaning drive mechanism is disposed at a rear side of a lower end of a steering shaft in the front-back direction of the vehicle body. A front end of the leaning drive mechanism is disposed at a front side of an upper end of the steering shaft. At least a portion of the leaning drive mechanism is disposed at a down side of the steering shaft in the up-down direction of the vehicle body.

17 Claims, 16 Drawing Sheets

(51) Int. Cl.
    *B62K 5/05*   (2013.01)
    *B62K 5/08*   (2006.01)
    *B62K 21/18*  (2006.01)
    *B62K 5/027*  (2013.01)

(56) References Cited

U.S. PATENT DOCUMENTS

| | | | | |
|---|---|---|---|---|
| 8,070,172 | B1* | 12/2011 | Smith | B60G 11/08 |
| | | | | 280/124.103 |
| 8,123,240 | B2 | 2/2012 | Mercier | |
| 8,583,325 | B2* | 11/2013 | Carabelli | B62K 5/027 |
| | | | | 701/38 |
| 9,278,711 | B2* | 3/2016 | Takano | B62K 5/05 |
| 2005/0167174 | A1* | 8/2005 | Marcacci | B60G 17/0152 |
| | | | | 180/76 |
| 2007/0075514 | A1 | 4/2007 | Saiki | |
| 2009/0194961 | A1* | 8/2009 | Dieziger | B60G 3/20 |
| | | | | 280/124.103 |
| 2011/0006498 | A1* | 1/2011 | Mercier | B62D 9/02 |
| | | | | 280/124.103 |
| 2011/0275256 | A1* | 11/2011 | Gibbs | B60F 3/0007 |
| | | | | 440/12.51 |
| 2012/0098225 | A1* | 4/2012 | Lucas | B60G 3/20 |
| | | | | 280/124.103 |
| 2012/0248717 | A1* | 10/2012 | Tsujii | B62K 5/01 |
| | | | | 280/5.509 |
| 2012/0310478 | A1* | 12/2012 | Carabelli | B62K 5/027 |
| | | | | 701/38 |
| 2013/0168944 | A1* | 7/2013 | Bartolozzi | B60G 3/01 |
| | | | | 280/269 |
| 2014/0172286 | A1* | 6/2014 | Moulene | G05D 1/0891 |
| | | | | 701/124 |
| 2015/0183484 | A1* | 7/2015 | Aillet | B62K 5/01 |
| | | | | 280/62 |
| 2015/0239522 | A1* | 8/2015 | Iizuka | B62K 5/027 |
| | | | | 280/267 |
| 2015/0246704 | A1* | 9/2015 | Takano | B60G 17/005 |
| | | | | 280/269 |
| 2016/0229246 | A1* | 8/2016 | Mori | B60G 3/26 |
| 2016/0229249 | A1* | 8/2016 | Mori | B62D 7/18 |
| 2016/0229251 | A1* | 8/2016 | Mori | B60G 13/003 |
| 2016/0375948 | A1* | 12/2016 | Takenaka | B62K 5/10 |
| | | | | 280/5.506 |
| 2017/0088219 | A1* | 3/2017 | Yoshikuni | B60G 13/003 |
| 2017/0106930 | A1* | 4/2017 | Hara | B62K 5/027 |
| 2017/0106935 | A1* | 4/2017 | Hara | B62K 5/10 |
| 2017/0106936 | A1* | 4/2017 | Shibuya | B62K 5/027 |
| 2018/0086168 | A1* | 3/2018 | Iguchi | B60G 17/0162 |
| 2018/0257706 | A1* | 9/2018 | Kanehara | B62K 21/18 |
| 2018/0257728 | A1* | 9/2018 | Kanehara | B62K 5/05 |
| 2018/0257731 | A1* | 9/2018 | Kanehara | B62K 5/05 |
| 2018/0264905 | A1* | 9/2018 | Kimura | B60G 17/0182 |
| 2018/0281543 | A1* | 10/2018 | Mori | B62K 5/003 |
| 2018/0281546 | A1* | 10/2018 | Mori | B60G 17/0157 |
| 2019/0084638 | A1* | 3/2019 | Melcher | B62K 5/08 |

FOREIGN PATENT DOCUMENTS

| | | |
|---|---|---|
| JP | 2010-052666 A | 3/2010 |
| JP | 2011-524836 A | 9/2011 |
| WO | WO 2011-059456 A1 | 5/2011 |

\* cited by examiner

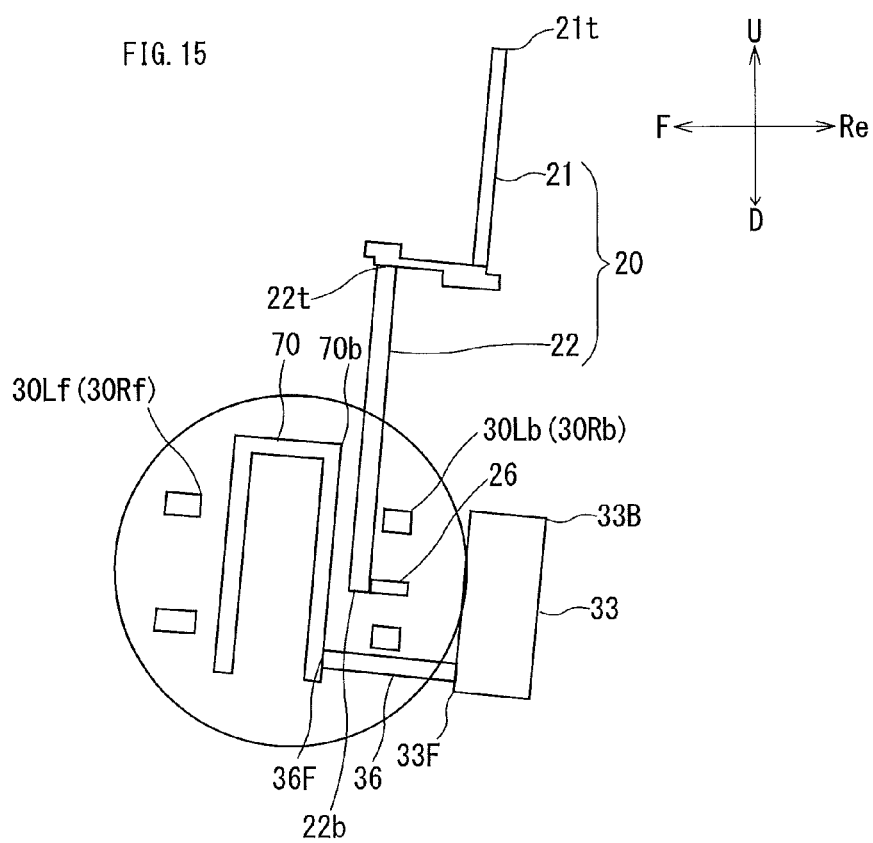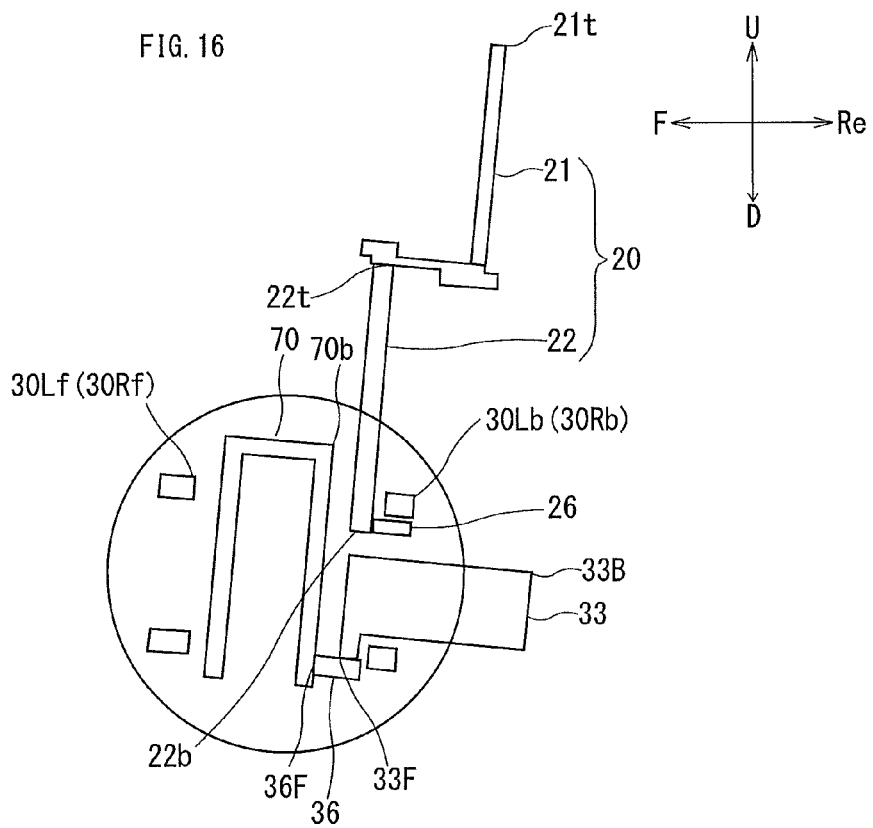

LEANING VEHICLE

CROSS-REFERENCE TO RELATED APPLICATION(S)

This non-provisional Application for a U.S. Patent is a Continuation of International Application PCT/JP2016/083614, filed on Nov. 11, 2016, which claims priority from JP PA 2015-223252, filed on Nov. 13, 2015, the entire contents of which are hereby incorporated by reference.

BACKGROUND OF THE INVENTION

1. Field of the Invention

The present invention relates to a leaning vehicle including a vehicle body and two steerable front wheels which are capable of leaning in the left-right direction of the vehicle.

2. Background of the Related Art

A vehicle which includes a vehicle body capable of leaning in the left-right direction of the vehicle, that is, a leaning vehicle, includes a left steerable front wheel and a right steerable front wheel. The leaning vehicle includes a left arm mechanism and a right arm mechanism. The left arm mechanism supports the left steerable front wheel such that the left steerable front wheel is steerable and capable of leaning. The left arm mechanism is supported by the vehicle body. The right arm mechanism supports the right steerable front wheel such that the right front steering is steerable and capable of leaning. The right arm mechanism is supported by the vehicle body. The left arm mechanism and the right arm mechanism are supported by the vehicle body in a swingable manner about an axis extending in the front-back direction of the vehicle. The leaning vehicle includes a steering shaft rotatably supported by the vehicle body. The left steerable front wheel and the right steerable front wheel are steered with the rotation of the steering shaft. The leaning vehicle includes a shock tower supported by the vehicle body in a swingable manner about an axis extending in the front-back direction of the vehicle. The shock tower connects the left arm mechanism and the right arm mechanism with each other by way of a left-right arm connection mechanism. The vehicle body, the left steerable front wheel and the right steerable front wheel lean left when the vehicle turns left. The vehicle body, the left steerable front wheel, and the right steerable front wheel lean right when the vehicle turns right. The shock tower basically does not lean in the left-right direction of the vehicle when the vehicle body, the left steerable front wheel and the right steerable front wheel lean in the left-right direction of the vehicle. The leaning vehicle includes a leaning drive mechanism between the shock tower and the vehicle body, and the leaning drive mechanism causes the vehicle body to lean with respect to the shock tower.

Patent Literature Citation 1: U.S. Pat. No. 8,123,240 B.

The leaning vehicle including the left steerable front wheel and the right steerable front wheel includes a steering mechanism and a leaning mechanism in the vicinity of the left steerable front wheel and the right steerable front wheel. The steering mechanism causes the left steerable front wheel and the right steerable front wheel to be steered. The leaning mechanism causes the vehicle body, the left steerable front wheel and the right steerable front wheel to lean. Accordingly, in laying out the leaning drive mechanism which applies a force for causing the vehicle body to lean, it is necessary to avoid interference between the steering mechanism, the leaning mechanism and the leaning drive mechanism. For this reason, the leaning vehicle easily increases in size in the vicinity of the left steerable front wheel and the right steerable front wheel.

It is an object of the present invention to provide a leaning vehicle where interference between a leaning drive mechanism which applies a force for causing a vehicle body to lean, a steering mechanism and a leaning mechanism can be avoided, and a size increase of the leaning vehicle in the vicinity of a left steerable front wheel and a right steerable front wheel can be suppressed.

SUMMARY OF THE INVENTION

To suppress a size increase of a vehicle in the vicinity of a left steerable front wheel and a right steerable front wheel, inventors of the present invention have studied a layout of a leaning drive mechanism which applies a force for causing the vehicle to lean. First, the inventors of the present invention have studied movement of a steering mechanism and a leaning mechanism.

In the left-right direction of the vehicle, a tie rod of the steering mechanism and a link member of the leaning mechanism do not largely lean even when a vehicle body, the left steerable front wheel and the right steerable front wheel largely lean. On the other hand, the steering shaft and the leaning drive mechanism largely lean together with the vehicle body. In addition, the leaning drive mechanism which largely leans is required to be connected to the link member of the leaning mechanism which does not largely lean. On the other hand, the steering shaft which largely leans is required to be connected to the tie rod of the steering mechanism which does not largely lean. The link member of the leaning mechanism which does not largely lean and the tie rod of the steering mechanism which does not largely lean are considered as one structural body which does not largely lean. Both the steering shaft which largely leans and the leaning drive mechanism which largely leans are required to be connected to the structural body which does not largely lean. In a conventionally proposed leaning vehicle, first, a steering shaft which largely leans is connected to the rear portion of a structural body which does not largely lean in the front-back direction of the leaning vehicle. Next, the leaning drive mechanism which largely leans is connected to a front portion of the structural body which does not largely lean. As described above, the structural body which does not largely lean, the steering shaft which largely leans, and the leaning drive mechanism which largely leans are arranged in the front-back direction of the leaning vehicle. Accordingly, the leaning vehicle easily increases in size in the vicinity of the left steerable front wheel and the right steerable front wheel. As a result, the entire leaning vehicle increases in size.

In view of the above, to suppress a size increase of the leaning vehicle, first, the inventors of the present invention have tried a technical concept which is opposite to the conventional technical concept. That is, the inventors of the present invention have tried the technical concept of disposing the leaning drive mechanism at an ideal position. As a result, the inventors of the present invention have found that the steering shaft which largely leans can be disposed at the up side of the leaning drive mechanism which largely leans in the up-down direction of the leaning vehicle. The inventors of the present invention have realized that, with such a configuration, in the front-back direction of the leaning vehicle, the steering shaft which largely leans is disposed in an overlapping manner with at least a portion of the leaning drive mechanism which largely leans and hence, a size increase of the entire leaning vehicle can be suppressed.

The leaning vehicle according to this embodiment includes: a vehicle body; a rear wheel; a left arm mechanism; a left steerable front wheel; a right arm mechanism; a right steerable front wheel; a leaning mechanism; a leaning drive mechanism; and a steering mechanism. The vehicle body is capable of leaning in a left-right direction of the leaning vehicle. The rear wheel is supported by the vehicle body. The left arm mechanism is disposed at the left side of the vehicle body in the left-right direction of the vehicle body. A right portion of the left arm mechanism is supported by the vehicle body in a swingable manner in an up-down direction of the vehicle body corresponding to a lean of the vehicle body. The left steerable front wheel is disposed at a front side of the rear wheel in a front-back direction of the vehicle body. The left steerable front wheel is steerably supported by a left portion of the left arm mechanism. The right arm mechanism is disposed at the right side of the vehicle body in the left-right direction of the vehicle body. A left portion of the right arm mechanism is supported by the vehicle body in a swingable manner in the up-down direction of the vehicle body corresponding to a lean of the vehicle body. The right steerable front wheel is disposed at the front side of the rear wheel in the front-back direction of the vehicle body. The right steerable front wheel is steerably supported by a right portion of the right arm mechanism. The leaning mechanism includes a left-right arm connection mechanism. The left-right arm connection mechanism connects the left arm mechanism and the right arm mechanism with each other. The left-right arm connection mechanism has a damping action for damping swinging of the left arm mechanism and the right arm mechanism in the up-down direction of the vehicle body. The leaning mechanism causes the vehicle body, the left steerable front wheel and the right steerable front wheel to lean leftward of the vehicle with turning of the vehicle to the left. The leaning mechanism causes the vehicle body, the left steerable front wheel and the right steerable front wheel to lean rightward of the vehicle with turning of the vehicle to the right. The leaning drive mechanism is disposed at a center portion of the vehicle body in the left-right direction. The leaning drive mechanism is disposed between any one of the left-right arm connection mechanism, the left arm mechanism or the right arm mechanism and the vehicle body. The leaning drive mechanism applies a swinging force which causes the left arm mechanism and the right arm mechanism to swing in the up-down direction of the vehicle body. The steering mechanism includes: a steering shaft; a rotary member; and a tie rod. The steering shaft is rotatably supported by the vehicle body. The rotary member is disposed at a lower portion of the steering shaft, and rotates together with the steering shaft. The tie rod is mounted on the rotary member, and is displaceable in the left-right direction of the vehicle body. The steering mechanism causes the left steerable front wheel and the right steerable front wheel to be steered with the rotation of the steering shaft. The steering shaft is disposed at the center portion of the vehicle body in the left-right direction. A lower end of the steering shaft is disposed at the front side of an upper end of the steering shaft in the front-back direction of the vehicle body. The upper end of the steering shaft is disposed at the rear side of a rear end of the right portion of the left arm mechanism and a rear end of the left portion of the right arm mechanism in the front-back direction of the vehicle body. The lower end of the steering shaft is disposed at the rear side of a front end of the right portion of the left arm mechanism and a front end of the left portion of the right arm mechanism in the front-back direction of the vehicle body. The lower end of the steering shaft is disposed at the front side of the rear end of the right portion of the left arm mechanism and the rear end of the left portion of the right arm mechanism in the front-back direction of the vehicle body. The leaning drive mechanism is disposed at the center portion of the vehicle body in the left-right direction. A rear end of the leaning drive mechanism is disposed at the rear side of the lower end of the steering shaft in the front-back direction of the vehicle body. A front end of the leaning drive mechanism is disposed at the front side of the upper end of the steering shaft. At least a portion of the leaning drive mechanism is disposed at the down side of the steering shaft in the up-down direction of the vehicle body.

In the leaning vehicle according to this embodiment, at least a portion of the leaning drive mechanism is disposed at the down side of the steering shaft in the up-down direction of the vehicle body. Accordingly, as viewed in the up-down direction of the vehicle body, at least the portion of the leaning drive mechanism is disposed in an overlapping manner with the steering shaft. For this reason, it is unnecessary to arrange, in the front-back direction of the leaning vehicle, the tie rod and the like which do not largely lean, the steering shaft which largely leans and the leaning drive mechanism which largely leans. As a result, a size increase of the entire leaning vehicle can be suppressed.

It is preferable that the leaning drive mechanism include a power source. It is preferable that a rear end of the power source be disposed at the rear side of the rear end of the right portion of the left arm mechanism and the rear end of the left portion of the right arm mechanism in the front-back direction of the vehicle body.

With such a configuration, as described above, a size increase of the entire leaning vehicle can be suppressed. In addition, the power source is disposed at a position close to the center of the vehicle body in the front-back direction. Accordingly, the position of the center of gravity of the vehicle approaches the center of the vehicle in the front-back direction. For this reason, a weight balance of the vehicle in the front-back direction can be easily adjusted.

It is preferable that the leaning drive mechanism include a speed reduction mechanism. It is preferable that a rear end of the speed reduction mechanism be disposed at the rear side of the rear end of the right portion of the left arm mechanism and the rear end of the left portion of the right arm mechanism in the front-back direction of the vehicle body.

With such a configuration, as described above, a size increase of the entire leaning vehicle can be suppressed. In addition, the speed reduction mechanism is disposed at a position close to the center of the vehicle body in the front-back direction. Accordingly, the center of gravity of the vehicle approaches the center of the vehicle in the front-back direction. For this reason, a weight balance of the vehicle in the front-back direction can be easily adjusted.

It is preferable that the leaning drive mechanism include a power source. It is preferable that a rear end of the power source be disposed at the rear side of the upper end of the steering shaft in the front-back direction of the vehicle body. With such a configuration, as described above, a size increase of the entire leaning vehicle can be suppressed. In addition, a weight balance of the vehicle in the front-back direction can be easily adjusted.

It is preferable that the leaning drive mechanism include a speed reduction mechanism. It is preferable that a rear end of the speed reduction mechanism be disposed at the rear side of the upper end of the steering shaft in the front-back direction of the vehicle body. With such a configuration, as described above, a size increase of the entire leaning vehicle can be suppressed. In addition, a weight balance of the vehicle in the front-back direction can be easily adjusted.

It is preferable that the leaning drive mechanism include a power source. It is preferable that the steering shaft include a first steering shaft and a second steering shaft. It is preferable that the second steering shaft be disposed at the front side of the first steering shaft in the front-back direction of the vehicle body. It is preferable that a rear end of the power source be disposed at the rear side of an upper end of the second steering shaft in the front-back direction of the vehicle body.

With such a configuration, as described above, a size increase of the entire leaning vehicle can be suppressed. In addition, a weight balance of the vehicle in the front-back direction can be easily adjusted. Further, the steering shaft is formed of two shafts and hence, a space is formed on the down side of the steering shaft. Accordingly, less restriction is imposed on a space for disposing the power source.

It is preferable that the leaning drive mechanism include a speed reduction mechanism. It is preferable that the steering shaft include a first steering shaft and a second steering shaft. It is preferable that the second steering shaft be disposed at the front side of the first steering shaft in the front-back direction of the vehicle body. It is preferable that a rear end of the speed reduction mechanism be disposed at the rear side of an upper end of the second steering shaft in the front-back direction of the vehicle body.

With such a configuration, as described above, a size increase of the entire leaning vehicle can be suppressed. In addition, a weight balance of the vehicle in the front-back direction can be easily adjusted. Further, the steering shaft is formed of two shafts and hence, a space is formed on the down side of the steering shaft. Accordingly, less restriction is imposed on a space for disposing the speed reduction mechanism.

It is preferable that the leaning drive mechanism include a drive connection portion. It is preferable that the drive connection portion be connected to at least any one of the left arm mechanism, the right arm mechanism or the left-right arm connection mechanism for transmitting a swinging force. It is preferable that a front end of the drive connection portion be disposed at the front side of the rear end of the right portion of the left arm mechanism and the rear end of the left portion of the right arm mechanism in the front-back direction of the vehicle body.

It is preferable that the leaning drive mechanism include a drive connection portion. It is preferable that the drive connection portion be connected to at least any one of the left arm mechanism, the right arm mechanism or the left-right arm connection mechanism for transmitting a swinging force. It is preferable that a front end of the drive connection portion be disposed at the front side of the lower end of the steering shaft in the front-back direction of the vehicle body.

It is preferable that the leaning drive mechanism include a drive connection portion. It is preferable that the drive connection portion be connected to at least any one of the left arm mechanism, the right arm mechanism or the left-right arm connection mechanism for transmitting a swinging force. It is preferable that a front end of the drive connection portion be disposed at the rear side of the front end of the right portion of the left arm mechanism and the front end of the left portion of the right arm mechanism in the front-back direction of the vehicle body.

According to the present invention, it is possible to provide a leaning vehicle where interference between a leaning drive mechanism which applies a force for causing a vehicle body to lean, a steering mechanism and a leaning mechanism can be avoided, and a size increase of the leaning vehicle in the vicinity of a left steerable front wheel and a right steerable front wheel can be suppressed.

BRIEF DESCRIPTION OF THE DRAWING

FIG. 15 is a side view schematically showing a layout of the leaning drive mechanism;

FIG. 16 is a side view schematically showing another embodiment of a position where the leaning drive mechanism is disposed;

DETAILED DESCRIPTION OF THE INVENTION

Figure 1:
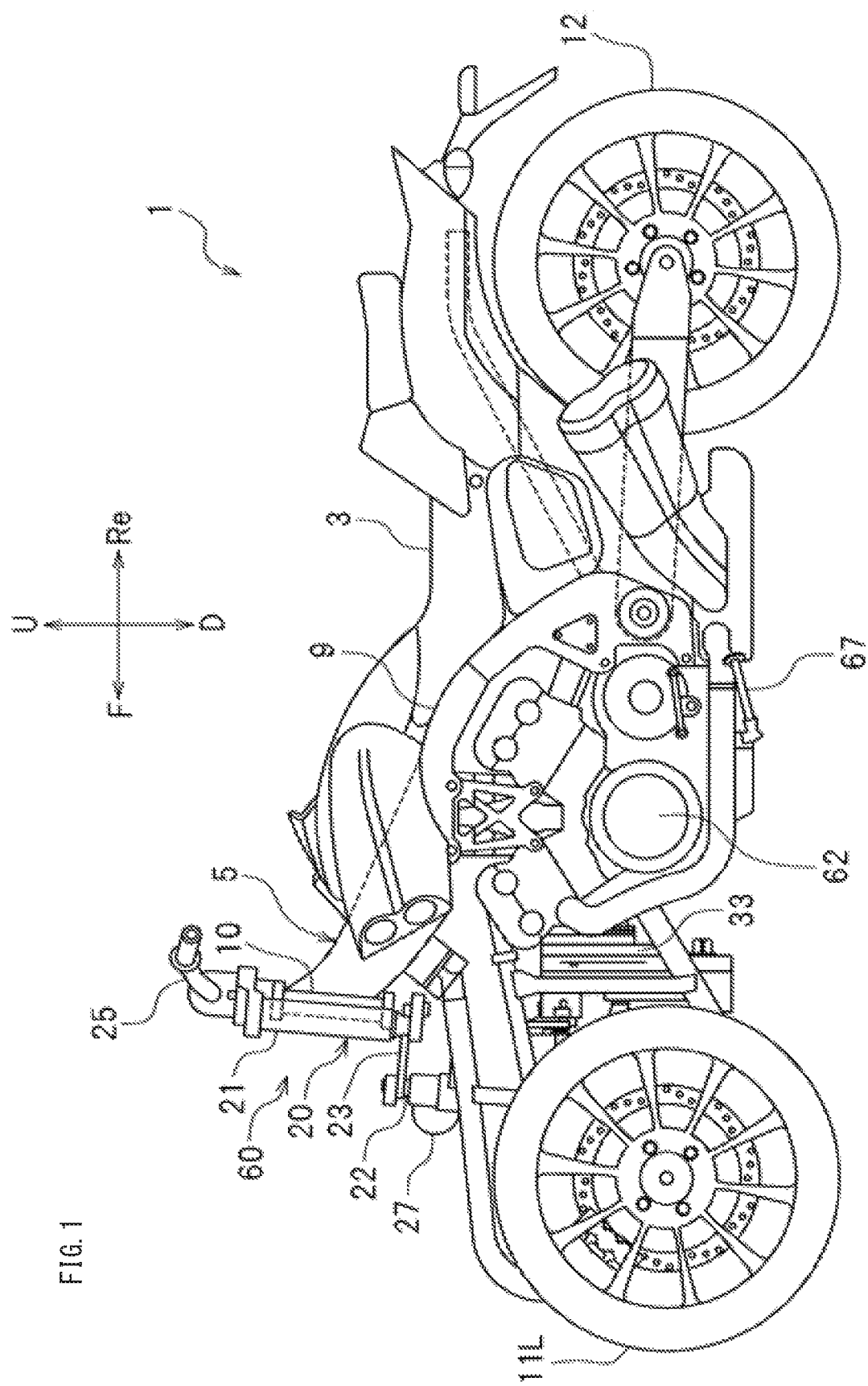
FIG. 1 is a left side view of a leaning vehicle according to one embodiment of the present invention.
Figure 2:
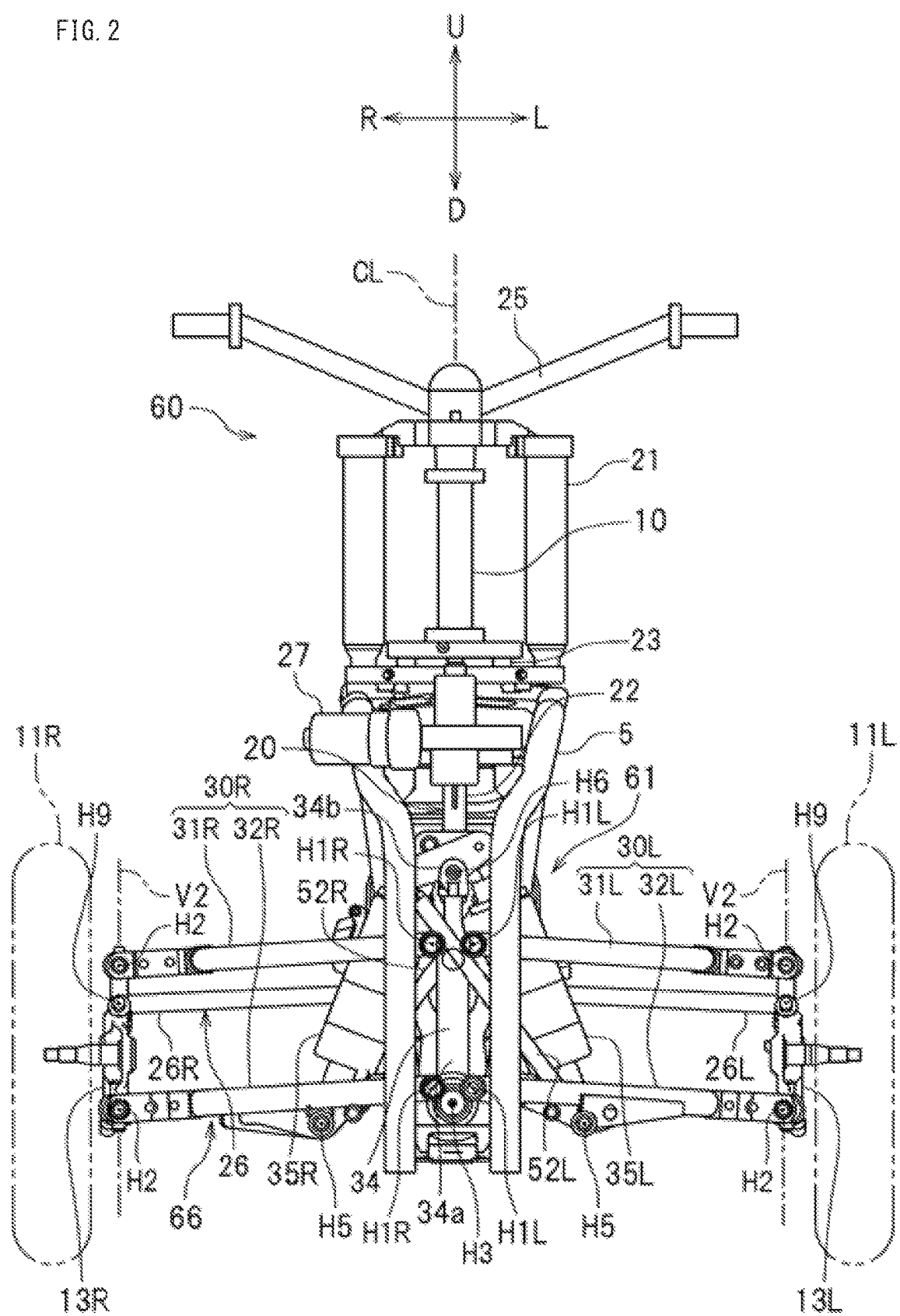
FIG. 2 is a front view of a portion of the leaning vehicle when a vehicle body is in an upright state.
Figure 3:
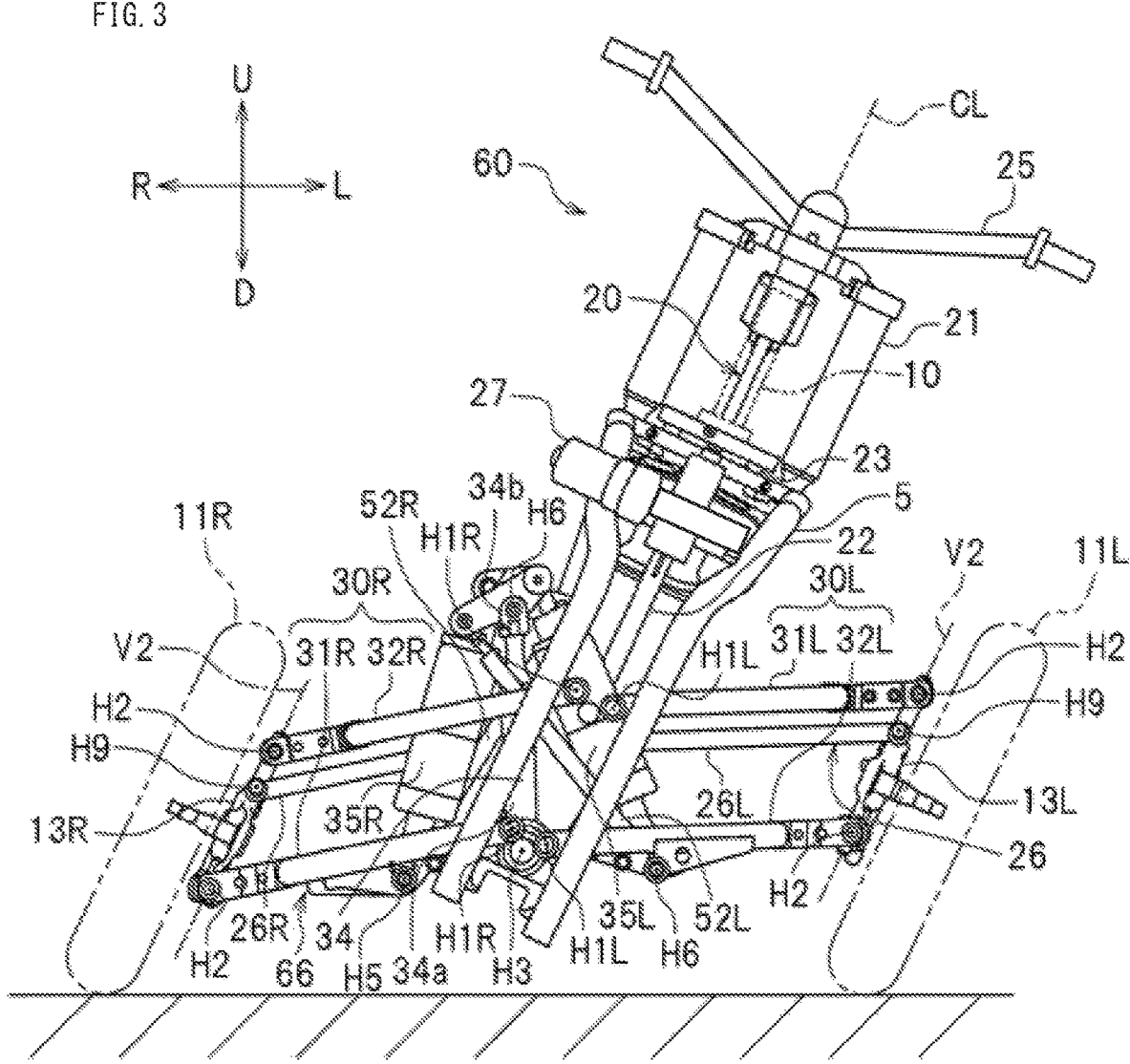
FIG. 3 is a front view of a portion of the leaning vehicle when the vehicle body is in a leaning state.

Hereinafter, embodiments of the present invention are described with reference to drawings. Referring to FIG. 1 and FIG. 2, a leaning vehicle according to this embodiment is a saddle-ride type three-wheeled vehicle (hereinafter, simply referred to as "vehicle") 1 including two steerable wheels 11L, 11R and one rear wheel 12. In this specification, referring to FIG. 3, "leaning vehicle" means a vehicle where, a vehicle body 5 is capable of leaning with respect to a ground surface, and a relative position between the left steerable front wheel 11L and the right steerable front wheel 11R in the up-down direction of the vehicle body 5 changes along with a lean of the vehicle body 5. Unless otherwise specified, "front", "rear", "left", "right", "up" and "down" respectively mean "front", "rear", "left", "right", "up" and "down" as viewed by an occupant seated on a seat 3 when the vehicle 1 is stationary on a horizontal plane in a non-steering state. Reference characters "F", "Re", "L", "R", "U", and "D" in the drawing respectively denote "front", "rear", "left", "right", "up", and "down". The description "the front-back direction of the vehicle body", the description "the up-down direction of the vehicle body", and the description "the left-right direction of the vehicle body" mean the front-back direction, the up-down direction, and the left-right direction with reference to the vehicle body. In a state where the vehicle 1 is not steered and the vehicle body 5 is upright, the front-back direction, the up-down direction, and the left-right direction of the vehicle body 5 respectively agree with the front-back direction, the up-down direction, and the left-right direction of the vehicle 1. However, when the vehicle 1 is in a steering state or the vehicle body 5 is in a leaning state, the front-back direction, the up-down direction, and the left-right direction of the vehicle body 5 may not agree with the front-back direction, the up-down direction, and the left-right direction of the vehicle 1 respectively. The description "an axis extending in the front-back direction" is not limited to an axis which is parallel to the front-back direction, and also includes an axis leaning with respect to the front-back direction within a range of −45° to +45°. In the same manner, the description "an axis extending in the up-down direction" includes an axis leaning with respect to the up-down direction within a range of −45° to +45°, and the description "an axis extending in the left-right direction" includes an axis leaning with respect to the left-right direction within a range of −45° to +45°.

It is sufficient for the vehicle body of the present invention to be a member of the vehicle which mainly receives a stress. The vehicle body may be a frame formed by combining a plurality of parts or a frame formed by integral molding. A material for forming the vehicle body may be metal such as aluminum or iron, a resin such as CFRP, or a combination of these materials. Further, the vehicle body may have a monocoque structure where the vehicle body is formed of an appearance component of a vehicle, or a semi-monocoque structure where a portion of the vehicle body also functions as an appearance component of the vehicle.

In the present invention, a left portion of an arm mechanism or an arm member means a portion of the arm mechanism or the arm member disposed at the left side of the center of the arm mechanism or the arm member when the arm mechanism or the arm member is divided into two in terms of length in the left-right direction of the vehicle body.

In the present invention, a right portion of the arm mechanism or the arm member means a portion of the arm mechanism or the arm member disposed at the right side of the center of the arm mechanism or the arm member when the arm mechanism or the arm member is divided into two in terms of length in the left-right direction of the vehicle body.

In the present invention, a center portion of the vehicle body in the left-right direction means a left center portion and a right center portion of the vehicle body when the vehicle body is divided into four consisting of a left end portion, the left center portion, the right center portion, and a right end portion in terms of length in the left-right direction of the vehicle body. The center portion of the vehicle body in the left-right direction means a portion of the vehicle body which includes the center of the vehicle body in the left-right direction.

Referring to FIG. 1 and FIG. 2, the vehicle 1 includes: the vehicle body 5; the left steerable front wheel 11L; the right steerable front wheel 11R; the rear wheel 12; a steering mechanism 60; a leaning mechanism 61; a seat 3; and a power unit 62.

Referring to FIG. 1, the vehicle body 5 includes a head pipe 10 and a main frame 9 extending rearward from the head pipe 10 when the vehicle is viewed from the side. The head pipe 10 extends in the obliquely rearward and upward direction when the vehicle is viewed from the side. Referring to FIG. 2, the head pipe 10 extends in the up-down direction of the vehicle body 5 when the vehicle is viewed from the front side. The vehicle body 5 is capable of leaning in the left-right direction of the vehicle 1.

A left arm mechanism 30L includes a left lower arm 32L and a left upper arm 31L disposed at the up side of the left lower arm 32L. The left arm mechanism 30L is disposed at the left side of the vehicle body 5 in the left-right direction of the vehicle body 5. To be more specific, the left lower arm 32L and the left upper arm 31L are disposed at the left side of a vehicle center line CL. The description "vehicle center line CL" means a line intersecting with a center axis of the head pipe 10, and extending in the front-back direction of the vehicle body 5.

Figure 4:
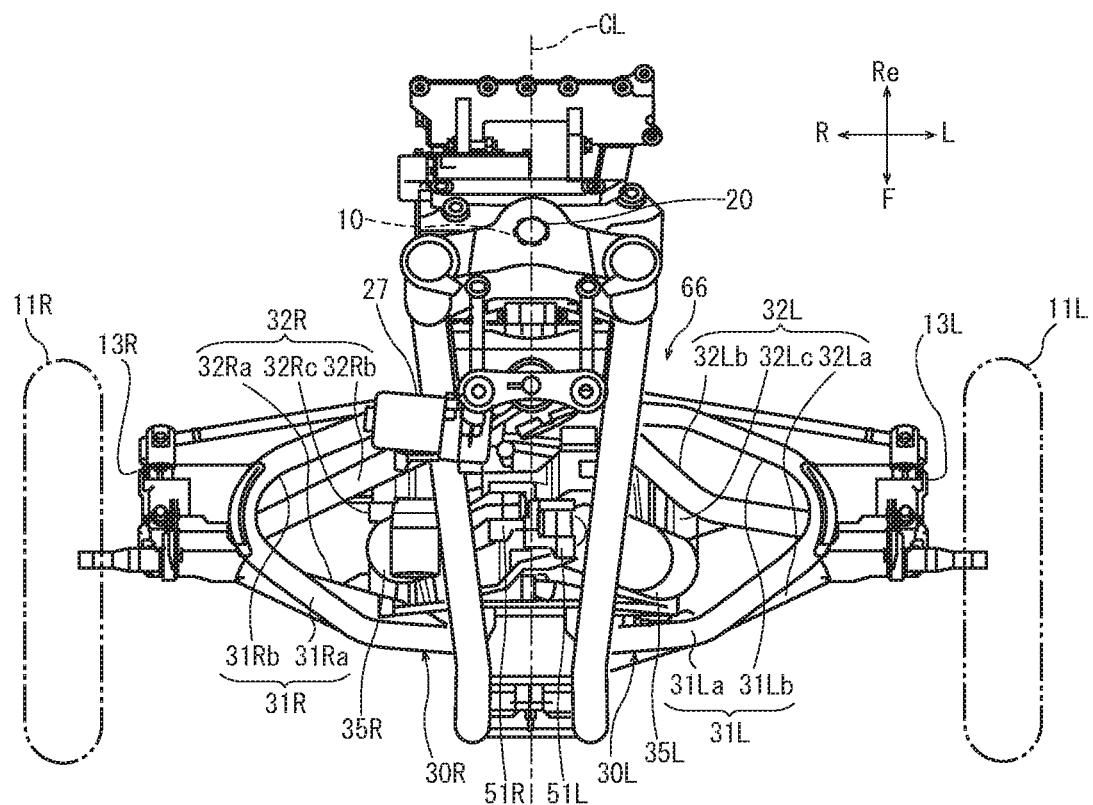
FIG. 4 is a view of a portion of the leaning vehicle as viewed along the axial direction of a head pipe.

Referring to FIG. 4, the left lower arm 32L includes: a front half portion 32La; a rear half portion 32Lb; and a crossbar 32Lc. The rear half portion 32Lb is positioned on the rear side of the front half portion 32La. The crossbar 32Lc connects the front half portion 32La and the rear half portion 32Lb with each other. The front half portion 32La and the rear half portion 32Lb are formed such that a distance between the front half portion 32La and the rear half portion 32Lb decreases as these portions extend leftward. A left portion of the front half portion 32La is connected with a left portion of the rear half portion 32Lb. The crossbar 32Lc extends in the front-back direction of the vehicle body 5. The left upper arm 31L includes a front half portion 31La and a rear half portion 31Lb. The rear half portion 31Lb is positioned on the rear side of the front half portion 31La. The front half portion 31La and the rear half portion 31Lb are formed such that a distance between the front half portion 31La and the rear half portion 31Lb decreases as these portions extend leftward. A left portion of the front half portion 31La is connected with a left portion of the rear half portion 31Lb.

Referring to FIG. 2, the left arm mechanism 30L includes a right portion and a left portion. That is, each of the left lower arm 32L and the left upper arm 31L includes a right portion and a left portion. The right portion of the left arm mechanism 30L is supported by the vehicle body 5 in a swingable manner in the up-down direction of the vehicle body corresponding to a lean of the vehicle body. To be more specific, the right portion of the left lower arm 32L and the right portion of the left upper arm 31L are supported by the vehicle body 5 in a swingable manner in the up-down direction about a first left axis H1L extending in the front-back direction of the vehicle body 5. The left portion of the left lower arm 32L and the left portion of the left upper arm 31L are supported by a left knuckle arm 13L in a swingable manner in the up-down direction about a second left axis H2 extending in the front-back direction of the vehicle body 5.

The right arm mechanism 30R has a shape which is left-right symmetric with the left arm mechanism 30L with respect to the vehicle center line CL. The right arm mechanism 30R includes a right lower arm 32R and a right upper arm 31R disposed at the up side of the right lower arm 32R. The right arm mechanism 30R is disposed at the right side of the vehicle body in the left-right direction of the vehicle body. To be more specific, the right lower arm 32R and the right upper arm 31R are disposed at the right side of the vehicle center line CL.

Referring to FIG. 4, the right lower arm 32R includes: a front half portion 32Ra; a rear half portion 32Rb; and a crossbar 32Rc. The rear half portion 32Rb is positioned on the rear side of the front half portion 32Ra. The crossbar 32Rc connects the front half portion 32Ra and the rear half portion 32Rb with each other. The front half portion 32Ra and the rear half portion 32Rb are formed such that a distance between the front half portion 32Ra and the rear half portion 32Rb decreases as these portions extend rightward. A right portion of the front half portion 32Ra is connected with a right portion of the rear half portion 32Rb. The crossbar 32Rc extends in the front-back direction of the vehicle body 5. The right upper arm 31R includes a front half portion 31Ra and a rear half portion 31Rb. The rear half portion 31Rb is positioned on the rear side of the front half portion 31Ra. The front half portion 31Ra and the rear half portion 31Rb are formed such that a distance between the front half portion 31Ra and the rear half portion 31Rb decreases as these portions extend rightward. A right portion of the front half portion 31Ra is connected with a right portion of the rear half portion 31Rb.

Referring to FIG. 2, the right arm mechanism 30R includes a left portion and a right portion. That is, each of the right lower arm 32R and the right upper arm 31R includes a right portion and a left portion. The left portion of the right arm mechanism 30R is supported by the vehicle body in a swingable manner in the up-down direction of the vehicle body corresponding to a lean of the vehicle body. To be more specific, the left portion of the right lower arm 32R and the left portion of the right upper arm 31R are supported by the vehicle body 5 in a swingable manner in the up-down direction about a first right axis H1R extending in the front-back direction of the vehicle body 5. The right portion of the right lower arm 32R and the right portion of the right upper arm 31R are supported by a right knuckle arm 13R in a swingable manner in the up-down direction about a second right axis H2 extending in the front-back direction of the vehicle body 5.

Referring to FIG. 1 and FIG. 2, the left steerable front wheel 11L is disposed at the left side of the vehicle center line CL. The left steerable front wheel 11L is disposed at the front side of the rear wheel 12 in the front-back direction of the vehicle body 5. The left steerable front wheel 11L is steerably supported by the left portion of the left arm mechanism 30L. To be more specific, the left knuckle arm 13L is steerably supported by the left portion of the left arm mechanism 30L. The left steerable front wheel 11L is rotatably supported by the left knuckle arm 13L.

The right steerable front wheel 11R is disposed at the right side of the vehicle center line CL. The right steerable front wheel 11R is disposed at the front side of the rear wheel 12 in the front-back direction of the vehicle body 5. The right steerable front wheel 11R is steerably supported by the right portion of the right arm mechanism 30R. To be more specific, the right knuckle arm 13R is steerably supported by the right portion of the right arm mechanism 30R. The right steerable front wheel 11R is rotatably supported by the right knuckle arm 13R.

The leaning mechanism 61 includes a left-right arm connection mechanism 70. The left-right arm connection mechanism 70 connects the left arm mechanism 30L and the right arm mechanism 30R with each other. The left-right arm connection mechanism 70 has a damping action for damping swinging of the left arm mechanism 30L and the right arm mechanism 30R in the up-down direction of the vehicle body 5. The leaning mechanism 61 causes the vehicle body 5, the left steerable front wheel 11L and the right steerable front wheel 11R to lean leftward of the vehicle 1 when the vehicle 1 turns left. The leaning mechanism 61 causes the vehicle body 5, the left steerable front wheel 11L and the right steerable front wheel 11R to lean rightward of the vehicle 1 when the vehicle 1 turns right.

To be specific, the left-right arm connection mechanism 70 includes a shock tower 34, a left cushion unit 35L, and a right cushion unit 35R. The shock tower 34 is supported by the vehicle body 5 in a swingable manner about an axis H3 extending in the front-back direction of the vehicle body 5. The shock tower 34 transmits an upward motion of the left steerable front wheel 11L to the right steerable front wheel 11R as a downward motion in the up-down direction of the vehicle body 5. The shock tower 34 transmits an upward motion of the right steerable front wheel 11R to the left steerable front wheel 11L as a downward motion in the up-down direction of the vehicle body 5. In short, the left arm mechanism 30L, the right arm mechanism 30R and the leaning mechanism 61 form a double wishbone suspension.

The shock tower 34 according to this embodiment is formed into a plate shape extending in the up-down direction. However, a shape of the shock tower 34 is not particularly limited. A lower end portion 34a of the shock tower 34 is supported by the vehicle body 5 in a freely swingable manner about an axis H3 extending in the front-back direction of the vehicle body 5.

Figure 5:
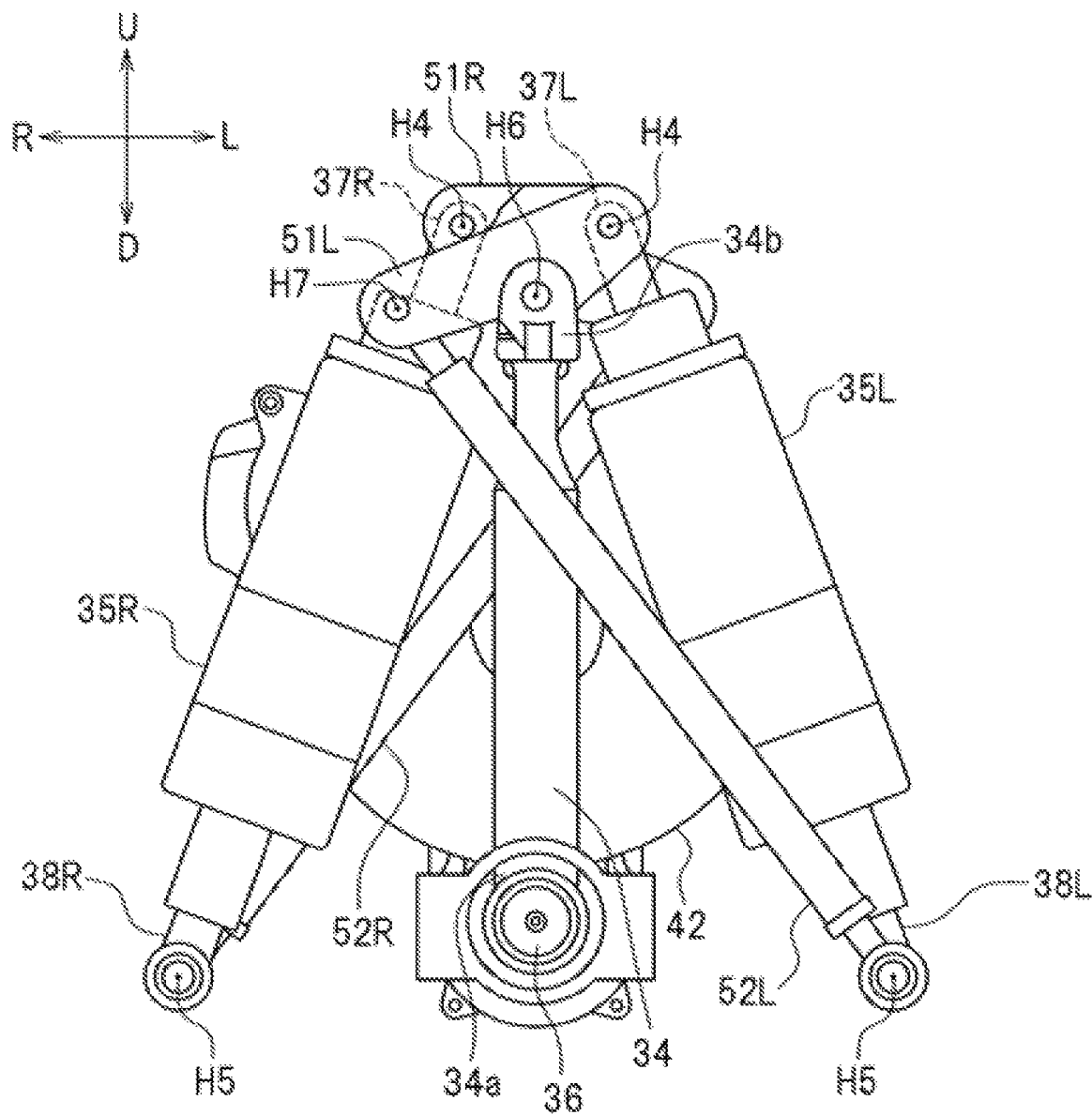
FIG. 5 is a front view of a portion of a leaning mechanism.
Figure 6:
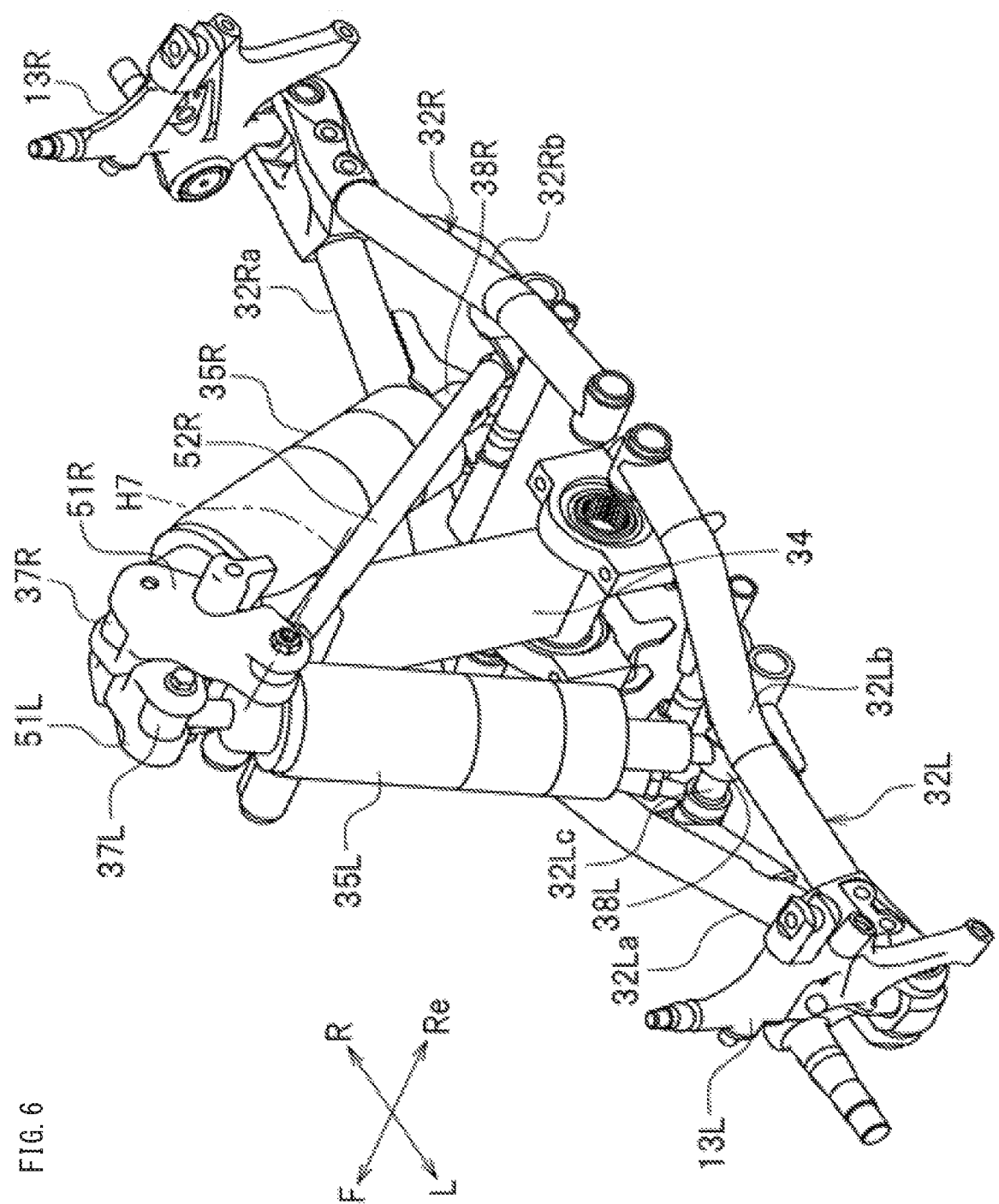
FIG. 6 is a perspective view of a portion of the leaning mechanism.

Referring to FIG. 5, a first left arm 51L and a first right arm 51R are supported by an upper end portion 34b of the shock tower 34 in a swingable manner about an axis H6 extending in the front-back direction of the vehicle body 5. Referring to FIG. 6, in this embodiment, the first left arm 51L is disposed at the front side of the first right arm 51R. However, the first left arm 51L may be disposed at the rear side of the first right arm 51R.

A second left arm 52L is connected to the first left arm 51L, and a second right arm 52R is connected to the first right arm 51R. The second left arm 52L and the second right arm 52R are formed into a rod shape. Referring to FIG. 5, an upper end portion of the second left arm 52L is supported by the first left arm 51L in a swingable manner about an axis H7 extending in the front-back direction of the vehicle body 5. A lower end portion of the second left arm 52L is supported by the left lower arm 32L of the left arm mechanism 30L in a swingable manner about an axis H5 extending in the front-back direction of the vehicle body 5. The lower end portion of the second left arm 52L is supported by the crossbar 32Lc of the left lower arm 32L. The lower end portion of the second left arm 52L may be supported by the left upper arm 31L of the left arm mechanism 30L. An upper end portion of the second right arm 52R is supported by the first right arm 51R in a freely swingable manner about an axis H7 extending in the front-back direction of the vehicle body 5. A lower end portion of the second right arm 52R is supported by the right lower arm 32R of the right arm mechanism 30R in a freely swingable manner about an axis H5 extending in the front-back direction of the vehicle body 5. The lower end portion of the second right arm 52R is supported by the crossbar 32Rc of the right lower arm 32R. The lower end portion of the second right arm 52R may be supported by the right upper arm 31R of the right arm mechanism 30R.

Each of the left cushion unit 35L and the right cushion unit 35R is a unit where a spring and a damper are formed into one integral body. The structure of the left cushion unit 35L and the right cushion unit 35R is well known so that the detailed description of the left cushion unit 35L and the right cushion unit 35R is omitted. In the drawing, the illustration of the spring is omitted.

Referring to FIG. 5, the left cushion unit 35L includes a first end portion 38L and a second end portion 37L. The first end portion 38L is supported by the left lower arm 32L of the left arm mechanism 30L in a swingable manner about the axis H5 extending in the front-back direction of the vehicle body 5. The first end portion 38L is supported by the crossbar 32Lc of the left lower arm 32L. However, the first end portion 38L may be supported by the left upper arm 31L of the left arm mechanism 30L. The second end portion 37L is supported by the first left arm 51L in a swingable manner about an axis H4 extending in the front-back direction of the vehicle body 5. In a state where the vehicle 1 is stopped upright on a horizontal plane in a non-steering state (hereinafter referred to as an upright non-steering state), when the vehicle is viewed from the front side, the axis H4 is positioned on the left side of the axis H6, and the axis H7 is positioned on the right side of the axis H6. In the upright non-steering state, when the vehicle is viewed from the front side, either one of the left cushion unit 35L or the second left arm 52L overlaps with the shock tower 34. In this embodiment, the second left arm 52L overlaps with the shock tower 34. However, the left cushion unit 35L may overlap with the shock tower 34.

The right cushion unit 35R includes a first end portion 38R and a second end portion 37R. The first end portion 38R is supported by the right lower arm 32R of the right arm mechanism 30R in a swingable manner about the axis H5 extending in the front-back direction of the vehicle body 5. The first end portion 38R is supported by the crossbar 32Rc of the right lower arm 32R. However, the first end portion 38R may be supported by the right upper arm 31R of the right arm mechanism 30R. The second end portion 37R is supported by the first right arm 51R in a freely swingable manner about an axis H4 extending in the front-back direction of the vehicle body 5. In the upright non-steering state, when the vehicle is viewed from the front side, either one of the right cushion unit 35R or the second right arm 52R overlaps with the shock tower 34. In this embodiment, the second right arm 52R overlaps with the shock tower 34. However, the right cushion unit 35R may overlap with the shock tower 34.

Figure 7:
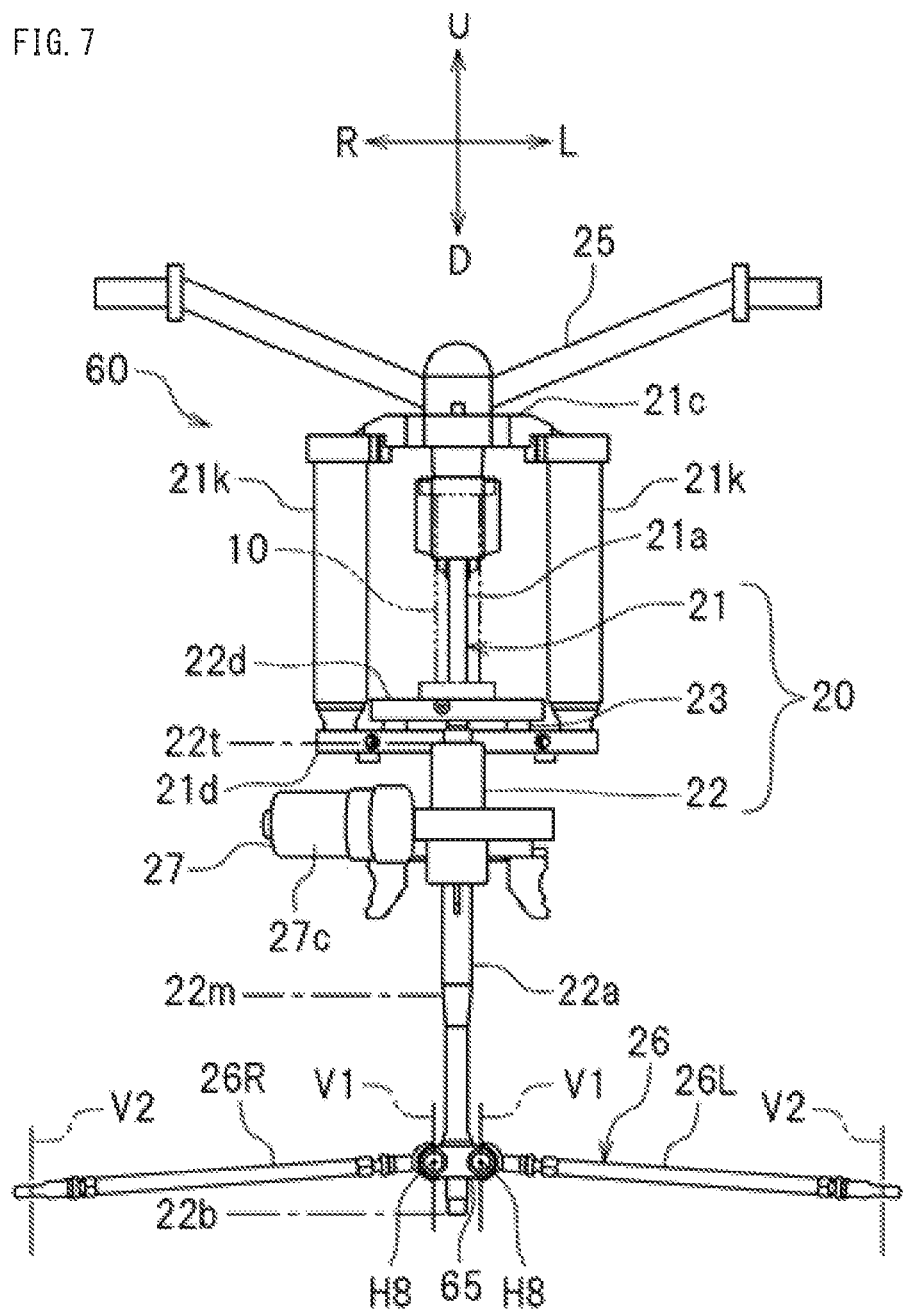
FIG. 7 is a front view of a steering mechanism.
Figure 8:
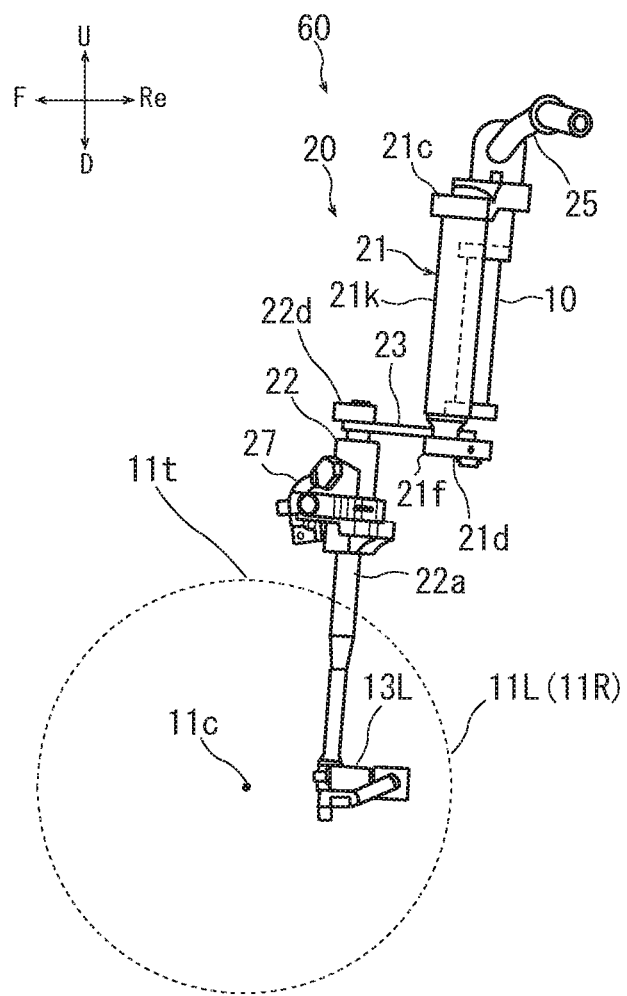
FIG. 8 is a side view of the steering mechanism.
Figure 9:
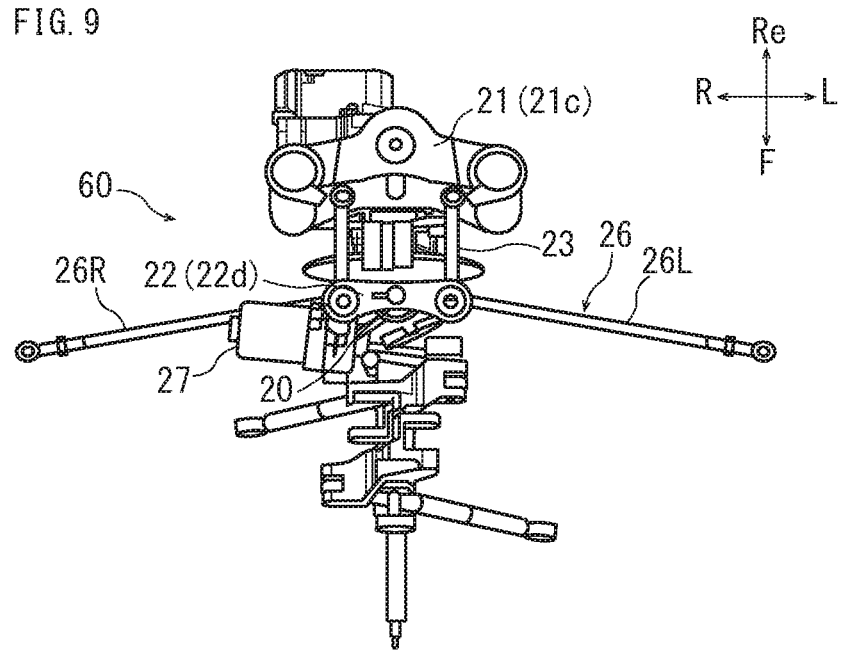
FIG. 9 is a plan view of the steering mechanism.

Next, the steering mechanism 60 is described. Referring to FIG. 7, FIG. 8, and FIG. 9, the steering mechanism 60 includes: a steering shaft 20; a rotary member 65; a handlebar 25; and a tie rod 26. The handlebar 25 is fixed to the steering shaft 20.

The steering shaft 20 is disposed at the center portion of the vehicle body 5 in the left-right direction. The steering shaft 20 includes a first steering shaft 21, a second steering shaft 22, and a connecting arm 23. The first steering shaft 21 is rotatably supported by the head pipe 10. The second steering shaft 22 is disposed at the front side of the first steering shaft 21 in the front-back direction of the vehicle body 5. The connecting arm 23 connects the first steering shaft 21 and the second steering shaft 22 with each other.

Referring to FIG. 7, the first steering shaft 21 includes a main shaft 21a, side pipes 21k, an upper cross member 21c, and a lower cross member 21d. The main shaft 21a is inserted into the head pipe 10. The side pipes 21k are disposed at the left and right sides of the main shaft 21a. The upper cross member 21c connects an upper end portion of the main shaft 21a and upper end portions of the side pipes 21k with each other. The lower cross member 21d connects a lower end portion of the main shaft 21a and lower end portions of the side pipes 21k with each other. The side pipes 21k, the upper cross member 21c, and the lower cross member 21d are not always necessary, and may be omitted.

The second steering shaft 22 includes a main shaft 22a and a bracket 22d connected to an upper end portion of the main shaft 22a. The connecting arm 23 is formed of a pair of left and right plates extending in the front-back direction of the vehicle body 5. The plates connect the lower cross member 21d and the bracket 22d with each other.

The rotary member 65 is disposed at a lower portion of the second steering shaft 22. The rotary member 65 rotates together with the steering shaft 20. The rotary member 65 is formed of a pitman arm, for example.

The tie rod 26 is mounted on the rotary member 65. The tie rod 26 is displaceable in the left-right direction of the vehicle body 5. The tie rod 26 includes a left tie rod 26L and a right tie rod 26R. The left tie rod 26L connects the second steering shaft 22 and the left steerable front wheel 11L with each other. The right tie rod 26R connects the second steering shaft 22 and the right steerable front wheel 11R with each other. A right end portion of the left tie rod 26L and a left end portion of the right tie rod 26R are supported by the rotary member 65 in a swingable manner about axes V1 extending in the up-down direction of the vehicle body 5. The right end portion of the left tie rod 26L and the left end portion of the right tie rod 26R are supported by the rotary member 65 in a swingable manner about axes H8 extending in the front-back direction of the vehicle body 5.

Referring to FIG. 2, a left end portion of the left tie rod 26L is supported by the left knuckle arm 13L in a swingable manner about an axis V2 extending in the up-down direction of the vehicle body 5, and in a swingable manner about an axis H9 extending in the front-back direction of the vehicle body 5. A right end portion of the right tie rod 26R is supported by the right knuckle arm 13R in a swingable manner about an axis V2 extending in the up-down direction of the vehicle body 5, and in a swingable manner about an axis H9 extending in the front-back direction of the vehicle body 5.

Referring to FIG. 7, the steering mechanism 60 further includes an actuator 27 for applying a rotational force to the steering shaft 20. The actuator 27 is mounted on the steering shaft 20. The actuator 27 plays a role of assisting steering performed by an occupant. A torque sensor not shown in the drawing is mounted on the steering shaft 20. The torque sensor is configured to detect a steering force applied to the steering shaft 20 by the occupant. That is, the torque sensor is configured to detect a torque. The actuator 27 is configured to output a driving force corresponding to a torque detected by the above-mentioned torque sensor.

The actuator 27 is mounted on the second steering shaft 22 at a portion on the up side of an intermediate position 22m disposed between an upper end 22t and a lower end 22b in the up-down direction of the vehicle body 5. The actuator 27 may be mounted on any of the first steering shaft 21, the connecting arm 23, or the second steering shaft 22. This embodiment shows the case where the actuator 27 is mounted on the second steering shaft 22.

Referring to FIG. 1, the vehicle 1 includes a side stand 67 which maintains the vehicle body 5 in a leaning posture. The side stand 67 is supported by the vehicle body 5. The side stand 67 is disposed at the left side of the vehicle center line CL. The side stand 67 and a motor 27c are respectively disposed at the left side and the right side of the center of the vehicle body 5 in the left-right direction. The side stand 67 and the motor 27c may be respectively disposed at the right side and the left side of the center of the vehicle body 5 in the left-right direction.

Referring to FIG. 1 and FIG. 2, the vehicle 1 according to this embodiment further includes a leaning drive mechanism 33. The leaning drive mechanism 33 is disposed at a center portion of the vehicle body 5 in the left-right direction. The leaning drive mechanism 33 is disposed between the left arm mechanism 30L, the right arm mechanism 30R and the vehicle body 5. The leaning drive mechanism 33 applies a swinging force to the left arm mechanism 30L and the right arm mechanism 30R, and the swinging force causes the left arm mechanism 30L and the right arm mechanism 30R to swing in the up-down direction of the vehicle body 5. To be more specific, the leaning drive mechanism 33 applies a rotational force about the first left axis H1L to the left arm mechanism 30L, and applies a rotational force about the first right axis H1R to the right arm mechanism 30R. The leaning drive mechanism 33 can change a relative position between the left steerable front wheel 11L and the right steerable front wheel 11R in the up-down direction of the vehicle body 5 corresponding to a lean of the vehicle body 5.

Figure 10:
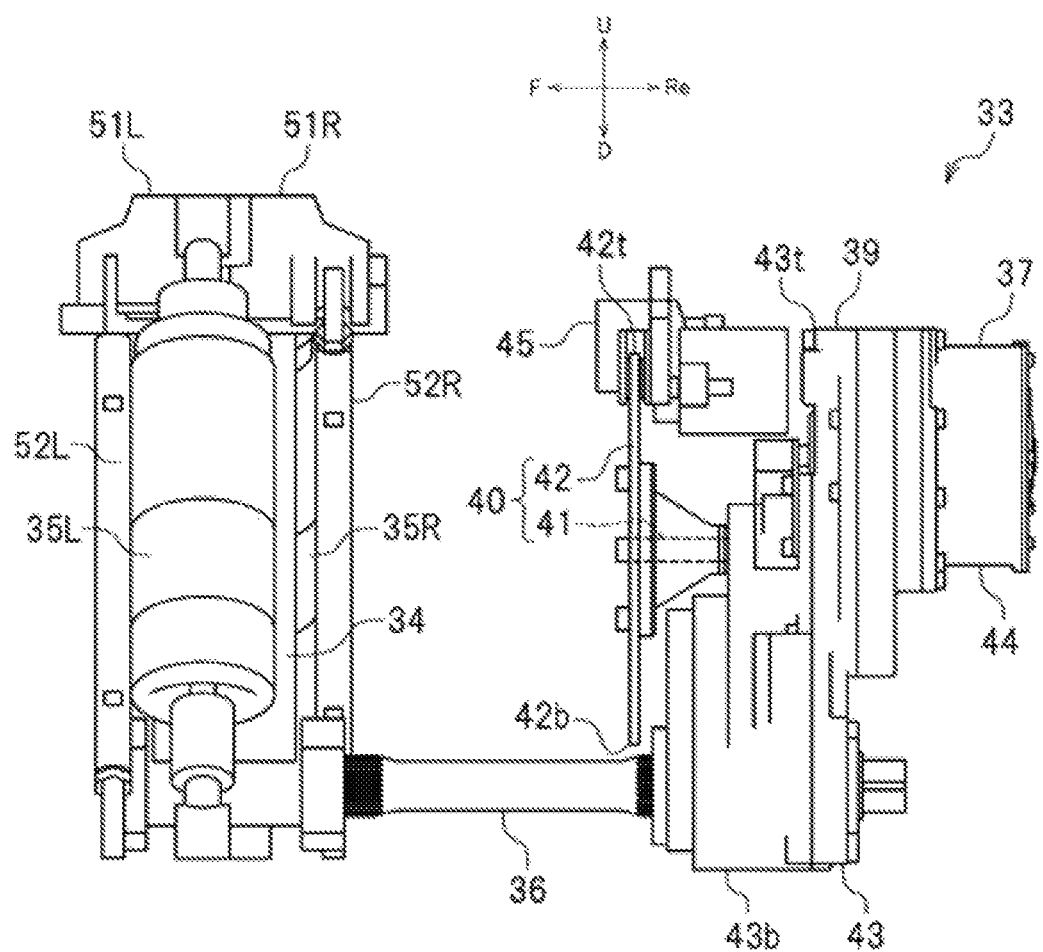
FIG. 10 is a side view of a portion of the leaning drive mechanism and a portion of a leaning mechanism.
Figure 11:
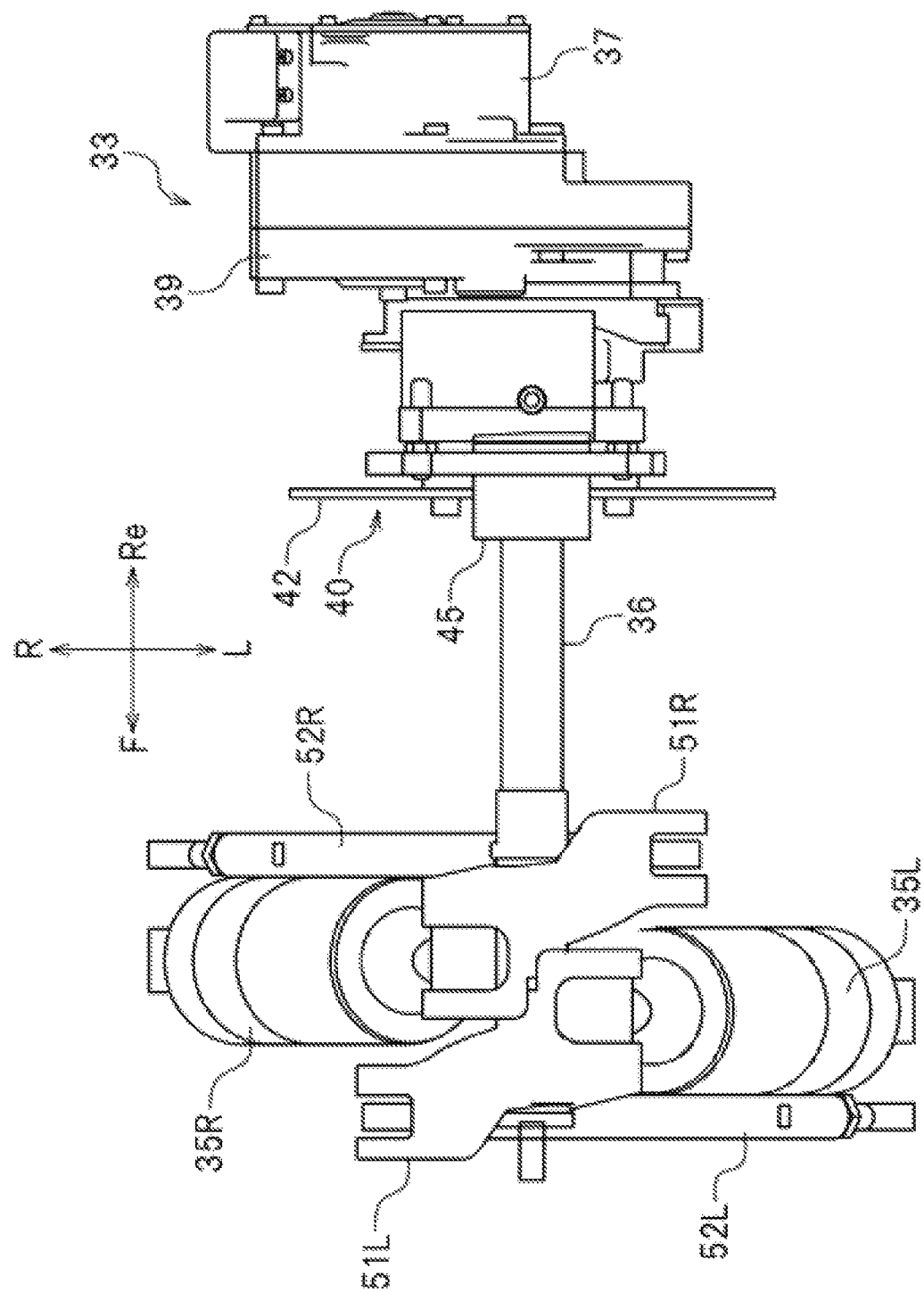
FIG. 11 is a plan view of a portion of the leaning drive mechanism and a portion of the leaning mechanism.

Referring to FIG. 10 and FIG. 11, the leaning drive mechanism 33 includes a motor 37, a speed reduction mechanism 39, and a brake member 40. The speed reduction mechanism 39 reduces rotational speed of the motor 37, and transmits the rotational speed. The brake member 40 restricts a rotation of the motor 37. A drive connection portion 36 is connected to the leaning drive mechanism 33. The motor 37, the speed reduction mechanism 39 and the brake member 40 are formed into one integral body. The drive connection portion 36 extends forward in the front-back direction of the vehicle body 5 from the leaning drive mechanism 33, and is connected to the shock tower 34. The brake member 40 includes a brake shaft 41 and a brake disc 42. The brake shaft 41 is connected to the speed reduction mechanism 39. The brake disc 42 is fixed to the brake shaft 41. The brake caliper 45 is supported by the vehicle body 5. The brake caliper 45 restricts a rotation of the motor 37 by holding the brake disc 42.

Figure 12:
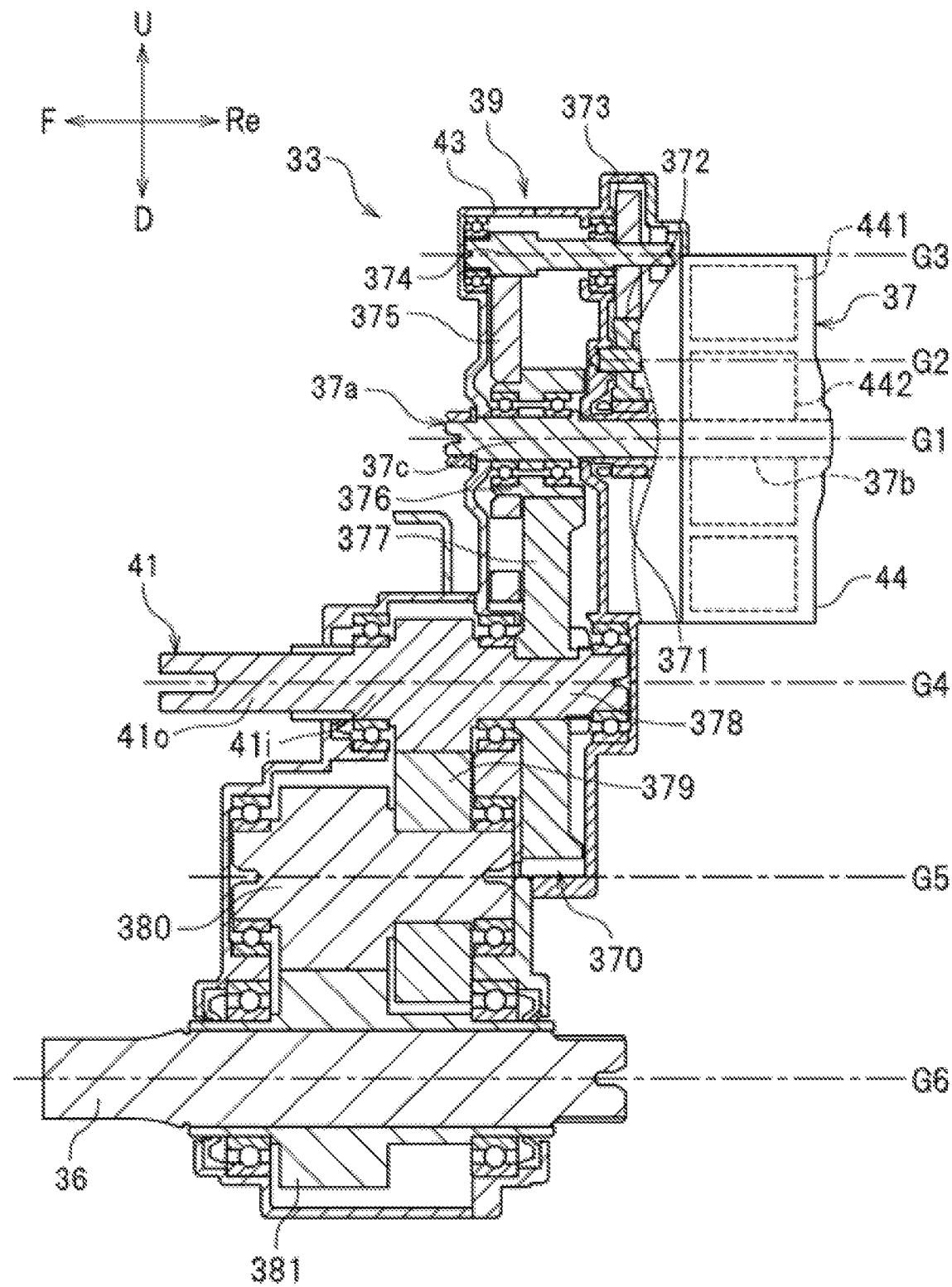
FIG. 12 is a cross-sectional view of the leaning drive mechanism.

FIG. 12 is a cross-sectional view of the leaning drive mechanism 33. The motor 37 includes a motor casing 44, a stator 441, a rotor 442, and a motor shaft 37a. The stator 441 and the rotor 442 are disposed in the motor casing 44. The motor shaft 37a is fixed to the rotor 442. The speed reduction mechanism 39 includes a gear casing 43 and speed reduction gears 370 disposed inside the gear casing 43. The plurality of speed reduction gears 370 are respectively disposed inside the gear casing 43. The plurality of speed reduction gears 370 includes a first gear 371, intermediate gears 372 to 380, and a final gear 381. The motor shaft 37a includes a first motor shaft portion 37b and a second motor shaft portion 37c. The first motor shaft portion 37b is disposed inside the motor casing 44. The second motor shaft portion 37c is disposed inside the gear casing 43.

The first gear 371 is mounted on the motor 37, and is fixed to the second motor shaft portion 37c. The final gear 381 is mounted on the drive connection portion 36. The intermediate gears 372 to 380 are disposed between the first gear 371 and the final gear 381. A torque of the first gear 371 is transmitted to the gears in the order of the intermediate gears 372, 373, 374, 375, 376, 377, 378, 379, 380, and the final gear 381. Rotational speed reduces as the torque of the first gear 371 is transmitted toward the final gear. In this embodiment, two or more intermediate gears are used. However, one intermediate gear may be used.

The brake shaft 41 may be mounted on any of the first gear 371, the intermediate gears 372 to 380, or the final gear 381. In this embodiment, the brake shaft 41 is mounted on the intermediate gear 378. The brake shaft 41 and the intermediate gear 378 may be separated components. This embodiment shows the case where the brake shaft 41 and the intermediate gear 378 are formed into one integral body. The brake shaft 41 includes: a first brake shaft portion 41i disposed inside the gear casing 43; and a second brake shaft portion 41o disposed outside the gear casing 43. The brake shaft 41 projects outside from the inside of the gear casing 43.

Axes of the first gear 371, the intermediate gears 372 to 380, and the final gear 381 extend in the vehicle front-back direction. Axes of the motor shaft 37a, the first gear 371, the intermediate gear 375, and the intermediate gear 376 agree with each other. Axes of the intermediate gears 373 and 374 agree with each other. Axes of the intermediate gears 377 and 378 agree with each other. Axes of the intermediate gears 379 and 380 agree with each other. Hereinafter, the axes of the motor shaft 37a, the first gear 371, and the intermediate gears 375 and 376 are denoted by a reference character G1. The axis of the intermediate gear 372 is denoted by a reference character G2. The axes of the intermediate gears 373 and 374 are denoted by a reference character G3. The axes of the intermediate gears 377 and 378 are denoted by a reference character G4. The axes of the intermediate gears 379 and 380 are denoted by a reference character G5. The axis of the final gear 381 is denoted by a reference character G6.

Figure 13:
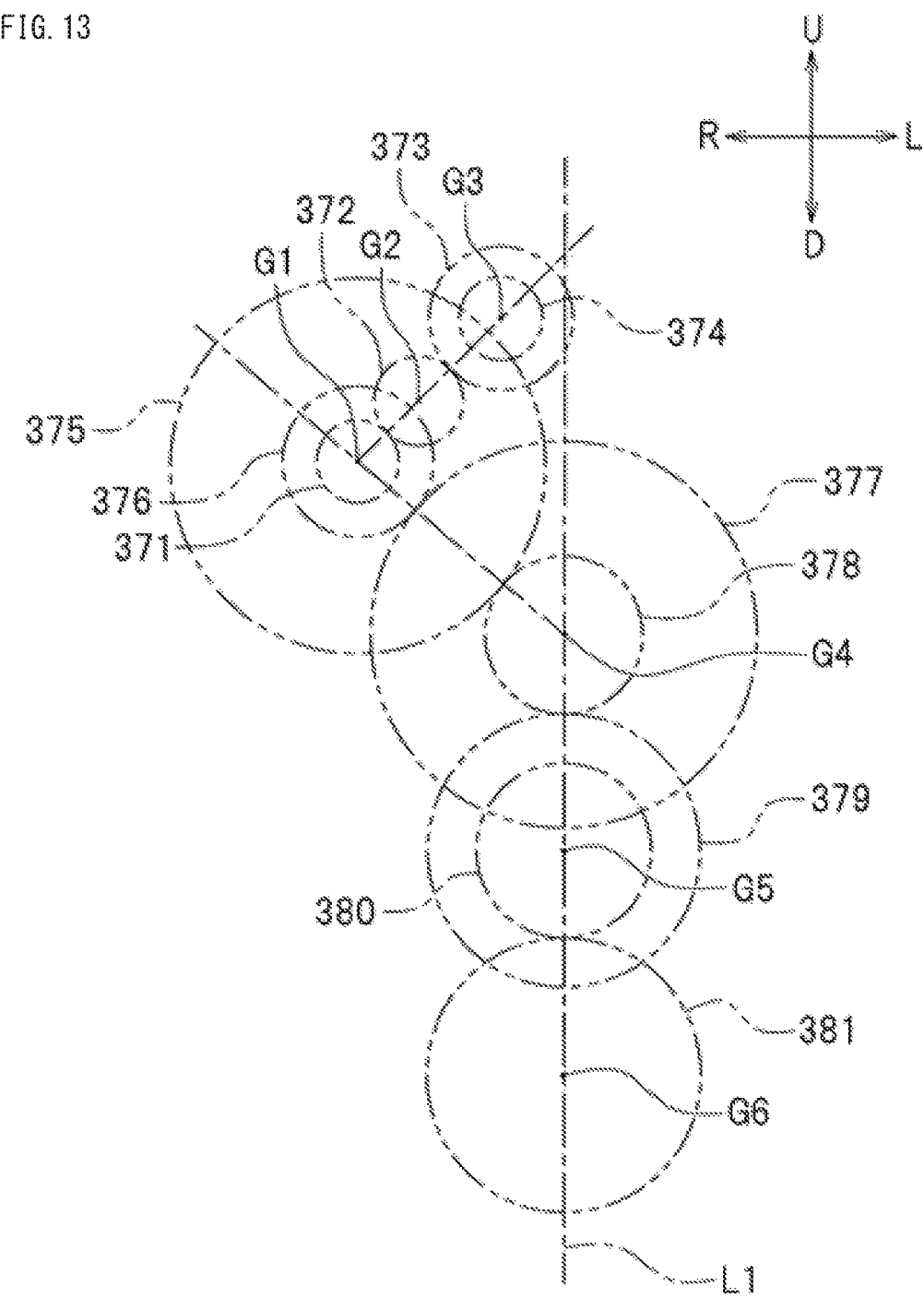
FIG. 13 is a view describing positions of axes of speed reduction gears when the vehicle is viewed from the front side.

FIG. 13 is a view showing positions of the axes G1 to G6 when the vehicle body 5 is viewed from the front side in the front-back direction of the vehicle body 5. In other words, FIG. 13 is a view describing the positions of the axes G1 to G6 when the vehicle is viewed from the front side. Referring to FIG. 13, the axes G4, G5, and G6 are arranged in the vehicle up-down direction. The axes G4, G5, and G6 are positioned on a first straight line L1 extending in the vehicle up-down direction. The axes G1, G2, and G3 are not positioned on the first straight line L1.

Layout of leaning drive mechanism:

Subsequently, a layout of the leaning drive mechanism of the vehicle 1 according to this embodiment is described.

Figure 14:
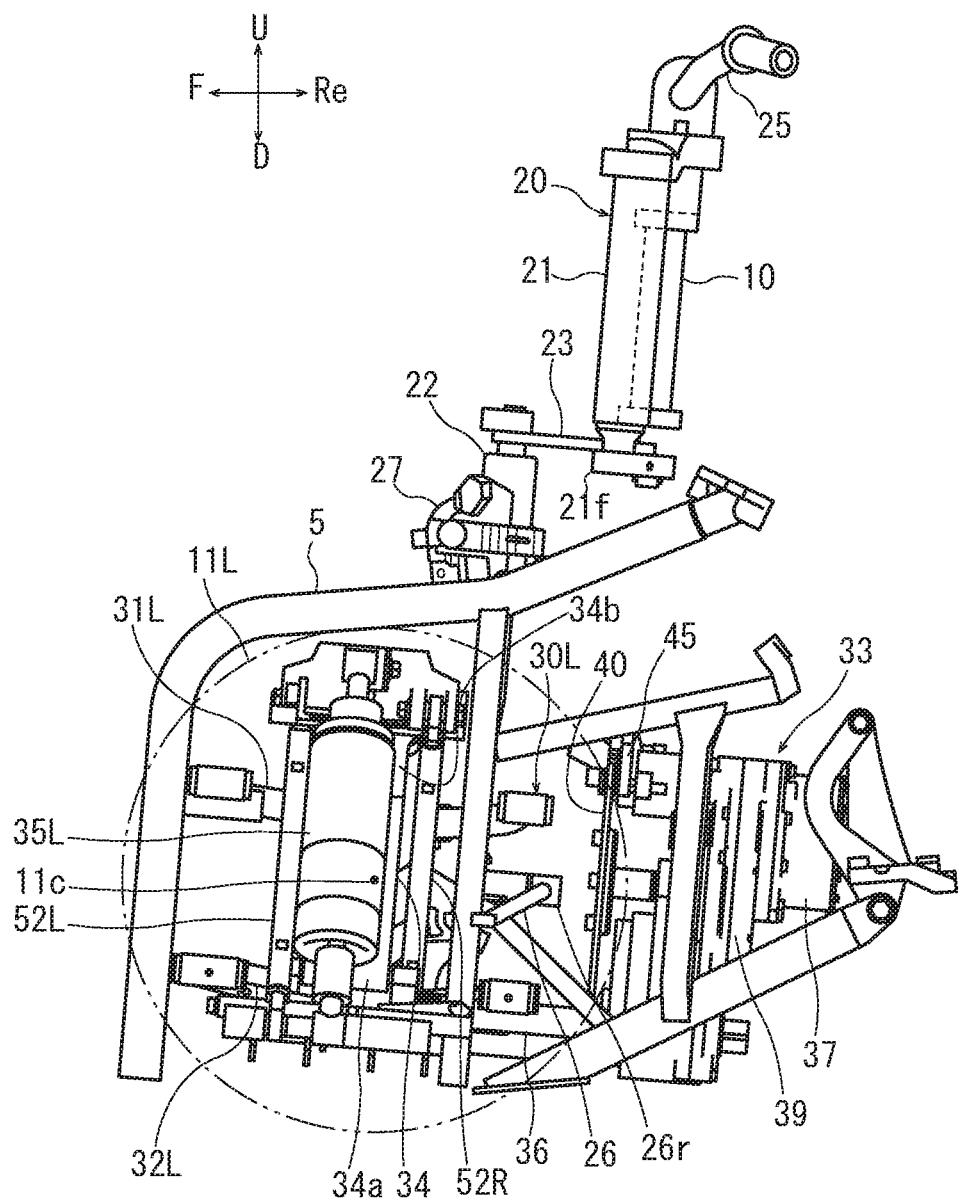
FIG. 14 is a side view of a portion of the leaning vehicle.

FIG. 14 is a side view of a portion of the vehicle. FIG. 15 is a side view schematically showing the layout of the leaning drive mechanism. FIG. 15 schematically shows the steering shaft 20, the left arm mechanism 30L, the right arm mechanism 30R, the leaning mechanism 61 and the leaning drive mechanism 33. The steering shaft 20 includes the first steering shaft 21 and the second steering shaft 22.

Referring to FIG. 14 and FIG. 15, in the front-back direction of the vehicle body 5, an upper end 21t of the first steering shaft 21 is disposed at the rear side of a rear end 30Lb of the right portion of the left arm mechanism 30L and a rear end 30Rb of the left portion of the right arm mechanism 30R. In the front-back direction of the vehicle body 5, the lower end 22b of the second steering shaft 22 is disposed at the rear side of a front end 30Lf of the right portion of the left arm mechanism 30L and a front end 30Rf of the left portion of the right arm mechanism 30R. In the front-back direction of the vehicle body 5, the lower end 22b of the second steering shaft 22 is disposed at the front side of the rear end 30Lb of the right portion of the left arm mechanism 30L and the rear end 30Rb of the left portion of the right arm mechanism 30R. That is, the lower end 22b of the second steering shaft 22 is disposed between the front end 30Lf and the rear end 30Lb of the left arm mechanism 30L. The lower end 22*b* of the second steering shaft 22 is disposed between the front end 30Rf and the rear end 30Rb of the right arm mechanism 30R.

In the front-back direction of the vehicle body 5, a rear end 33B of the leaning drive mechanism 33 is disposed at the rear side of the lower end 22*b* of the second steering shaft 22. In the front-back direction of the vehicle body 5, a front end 33F of the leaning drive mechanism 33 is disposed at the front side of the upper end 21*t* of the first steering shaft 21. In the up-down direction of the vehicle body 5, at least a portion of the leaning drive mechanism 33 is disposed at the down side of the steering shaft 20.

In short, as viewed in the up-down direction of the vehicle body 5, at least a portion of the leaning drive mechanism 33 is disposed in an overlapping manner with the steering shaft 20. Accordingly, it is unnecessary to arrange, in the front-back direction of the vehicle 1, the tie rod 26 and the like which do not largely lean, the steering shaft 20 which largely leans, and the leaning drive mechanism 33 which largely leans. For this reason, a size increase of the vehicle 1 in the vicinity of the left steerable front wheel 11L and the right steerable front wheel 11R can be suppressed. As a result, a size increase of the entire vehicle 1 can be suppressed.

Hereinafter, a preferred layout of the motor 37 and the speed reduction mechanism 39 which are included in the leaning drive mechanism 33, and the drive connection portion 36 is described.

Motor:

Referring to FIG. 14, a rear end 37B of the motor 37 is preferably disposed at the rear side of the rear end 30Lb of the right portion of the left arm mechanism 30L and the rear end 30Rb of the left portion of the right arm mechanism 30R in the front-back direction of the vehicle body 5. With such a configuration, the leaning drive mechanism 33 is disposed at the down side of the steering shaft 20 in the up-down direction of the vehicle body 5. Accordingly, as described above, a size increase of the entire vehicle 1 can be suppressed. In addition, the motor 37 is disposed at a position close to the center of the vehicle 1 in the front-back direction. Accordingly, the center of gravity of the vehicle 1 approaches the center of the vehicle 1 in the front-back direction. For this reason, a weight balance of the vehicle 1 in the front-back direction can be easily adjusted.

Further, when the steering shaft 20 includes the first steering shaft 21 and the second steering shaft 22, the rear end 37B of the motor 37 is preferably disposed at the rear side of the upper end 22*t* of the second steering shaft 22 in the front-back direction of the vehicle body 5. This is because, as described above, the motor 37 can be disposed at a position close to the center of the vehicle 1 in the front-back direction.

When the steering mechanism 60 includes one steering shaft 20, the rear end 37B of the motor 37 is preferably disposed at the rear side of an upper end 20*t* of the steering shaft 20 in the front-back direction of the vehicle body 5.

Speed reduction mechanism:

Referring to FIG. 14, in the front-back direction of the vehicle body 5, a rear end 39B of the speed reduction mechanism 39 is preferably disposed at the rear side of the rear end 30Lb of the right portion of the left arm mechanism 30L and the rear end 30Rb of the left portion of the right arm mechanism 30R. With such a configuration, the leaning drive mechanism 33 is disposed at the down side of the steering shaft 20 in the up-down direction of the vehicle body 5. Accordingly, as described above, a size increase of the entire vehicle 1 can be suppressed. In addition, the speed reduction mechanism 39 is disposed at a position close to the center of the vehicle 1 in the front-back direction. Accordingly, the center of gravity of the vehicle 1 approaches the center of the vehicle 1 in the front-back direction. For this reason, a weight balance of the vehicle 1 in the front-back direction can be easily adjusted.

Further, when the steering shaft 20 includes the first steering shaft 21 and the second steering shaft 22, the rear end 39B of the speed reduction mechanism 39 is preferably disposed at the rear side of the upper end 22*t* of the second steering shaft 22 in the front-back direction of the vehicle body 5. This is because, as described above, the speed reduction mechanism 39 can be disposed at a position close to the center of the vehicle 1 in the front-back direction.

When the steering mechanism 60 includes one steering shaft 20, the rear end 39B of the speed reduction mechanism 39 is preferably disposed at the rear side of the upper end 20*t* of the steering shaft 20 in the front-back direction of the vehicle body 5.

Drive connection portion:

A front end 36F of the drive connection portion 36 is preferably disposed at the front side of the rear end 30Lb of the right portion of the left arm mechanism 30L and the rear end 30Rb of the left portion of the right arm mechanism 30R in the front-back direction of the vehicle body 5. A front end 36B of the drive connection portion 36 is more preferably disposed at the front side of a lower end 20*b* of the steering shaft 20 in the front-back direction of the vehicle body 5. The leaning drive mechanism 33 is connected to the leaning mechanism from the rear side of the leaning mechanism in the front-back direction of the vehicle body 5. Accordingly, the front end 36F of the drive connection portion 36 is preferably disposed at the rear side of the front end 30Lf of the right portion of the left arm mechanism 30L and the front end 30Rf of the left portion of the right arm mechanism 30R in the front-back direction of the vehicle body 5.

In the description made above, the case has been described where the leaning drive mechanism 33 is disposed between any one of the left-right arm connection mechanism 70, the left arm mechanism 30L, or the right arm mechanism 30R and the vehicle body 5. However, the position where the leaning drive mechanism 33 is disposed is not limited to such a case.

FIG. 16 is a side view schematically showing another embodiment of the position where the leaning drive mechanism 33 is disposed. Referring to FIG. 16, the front end 33F of the leaning drive mechanism 33 is disposed at the front side of the rear end 30Lb of the left arm mechanism 30L and the rear end 30Rb of the right arm mechanism 30R in the front-back direction of the vehicle body 5. However, the front end 33F of the leaning drive mechanism 33 is disposed at the rear side of the rear end 70B of the left-right arm connection mechanism 70 in the front-back direction of the vehicle body 5. That is, the leaning drive mechanism 33 is disposed between the left-right arm connection mechanism 70 and the vehicle body 5.

Also in this case, as viewed in the up-down direction of the vehicle body 5, at least a portion of the leaning drive mechanism 33 is disposed in an overlapping manner with the steering shaft 20. Accordingly, a size increase of the entire vehicle 1 can be suppressed.

Figure 17:
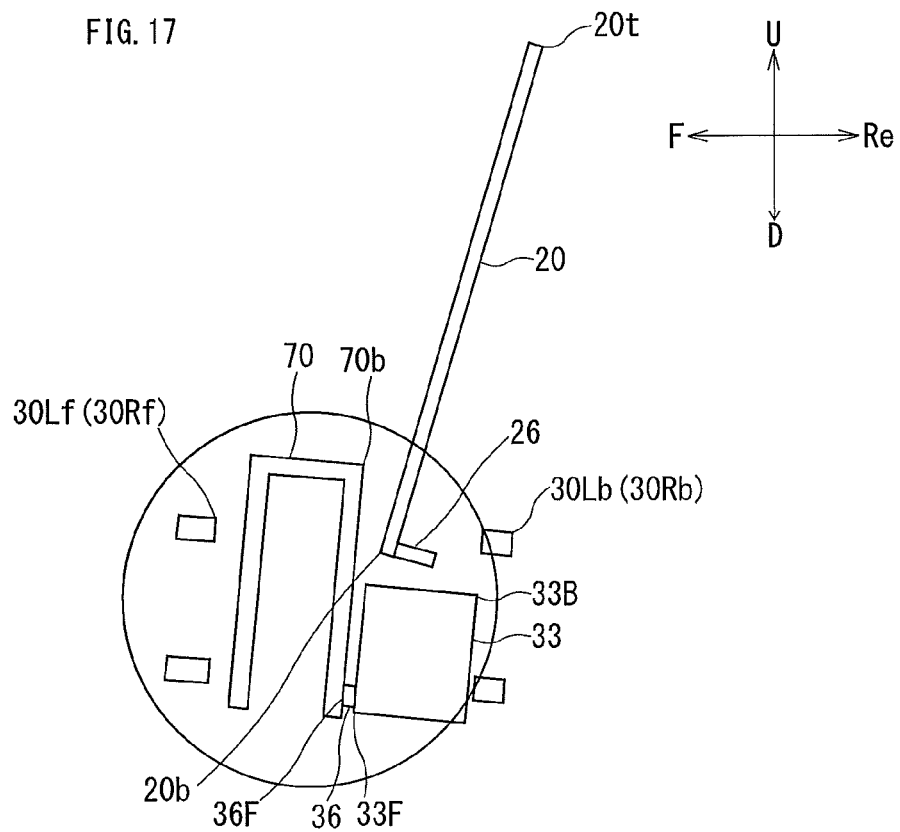
FIG. 17 is a side view schematically showing another embodiment of a position where the leaning drive mechanism is disposed.

FIG. 17 is a side view schematically showing another embodiment of the position where the leaning drive mechanism 33 is disposed. Referring to FIG. 17, the steering mechanism 60 includes one steering shaft 20. The entire leaning drive mechanism 33 is disposed at the front side of the rear end 30Lb of the left arm mechanism 30L and the rear end 30Rb of the right arm mechanism 30R in the front-back direction of the vehicle body 5. However, the front end 33F of the leaning drive mechanism 33 is disposed at the rear side of the rear end 70B of the left-right arm connection mechanism 70 in the front-back direction of the vehicle body 5. That is, the leaning drive mechanism 33 is disposed between the left-right arm connection mechanism 70 and the vehicle body 5.

Also in this case, as viewed in the up-down direction of the vehicle body 5, at least a portion of the leaning drive mechanism 33 is disposed in an overlapping manner with the steering shaft 20. Accordingly, a size increase of the entire vehicle 1 can be suppressed.

Figure 18:
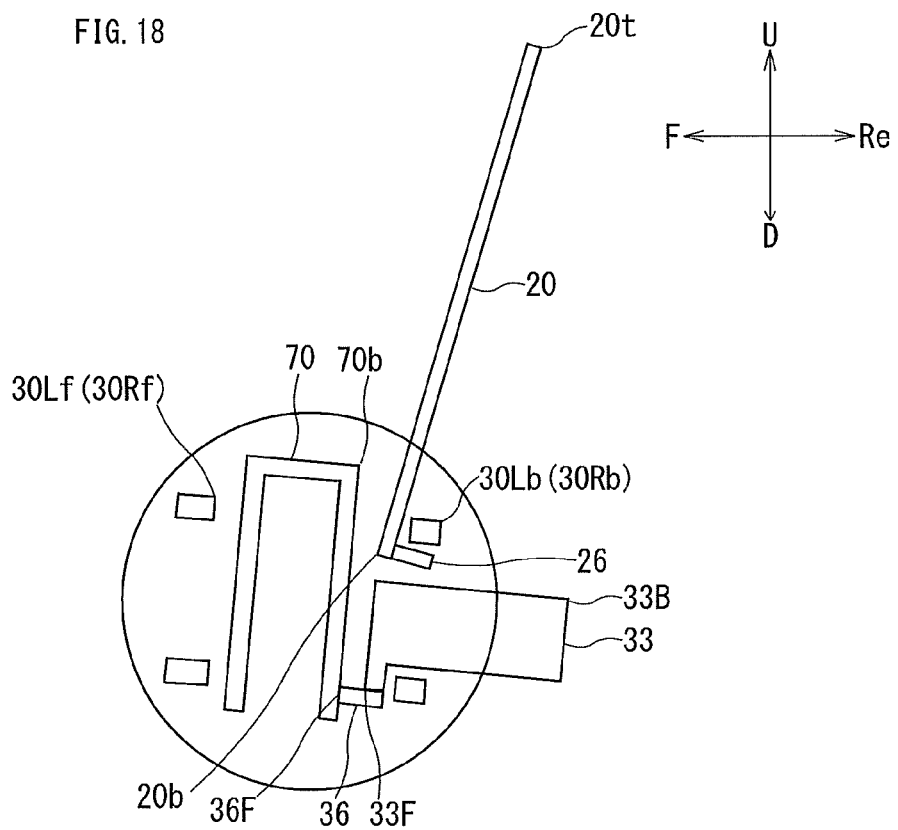
FIG. 18 is a side view schematically showing another embodiment of a position where the leaning drive mechanism is disposed.

FIG. 18 is a side view schematically showing another embodiment of the position where the leaning drive mechanism 33 is disposed. Referring to FIG. 18, the steering mechanism 60 includes one steering shaft 20. The front end 33F of the leaning drive mechanism 33 is disposed at the front side of the rear end 30Lb of the left arm mechanism 30L and the rear end 30Rb of the right arm mechanism 30R in the front-back direction of the vehicle body 5. However, the front end 33F of the leaning drive mechanism 33 is disposed at the rear side of the rear end 70B of the left-right arm connection mechanism 70 in the front-back direction of the vehicle body 5. That is, the leaning drive mechanism 33 is disposed between the left-right arm connection mechanism 70 and the vehicle body 5.

Also in this case, as viewed in the up-down direction of the vehicle body 5, at least a portion of the leaning drive mechanism 33 is disposed in an overlapping manner with the steering shaft 20. Accordingly, a size increase of the entire vehicle 1 can be suppressed.

The embodiments of the present invention have been described heretofore. However, it is needless to say that the present invention can be carried out in various embodiments, and is not limited to the above-mentioned embodiments.

The leaning vehicle of the present invention includes two steerable front wheels and one rear wheel. The rear wheel may be formed of a left rear wheel and a right rear wheel disposed such that the wheels are arranged in the left-right direction of the vehicle body. It is sufficient for the rear wheel to include at least one rear wheel.

It is sufficient for the left arm mechanism of the present invention to include at least one left arm member where a right portion of the left arm member is supported by the vehicle body in a swingable manner in the up-down direction of the vehicle body corresponding to a lean of the vehicle body. The left arm mechanism may include a plurality of left arm members arranged in the up-down direction of the vehicle body.

It is sufficient for the right arm mechanism of the present invention to include at least one right arm member where a left portion of the right arm member is supported by the vehicle body in a swingable manner in the up-down direction of the vehicle body corresponding to a lean of the vehicle body. The right arm mechanism may include a plurality of right arm members arranged in the up-down direction of the vehicle body.

The rear end of the right portion of the left arm mechanism in the present invention may be a rear end of the right portion of the left lower arm, or a rear end of the right portion of the left upper arm. It is sufficient that the rear end of the right portion of the left arm mechanism be the rear end of the right portion of the left lower arm or the rear end of the right portion of the left upper arm which is disposed rearmost in the front-back direction of the vehicle body.

The rear end of the left portion of the right arm mechanism in the present invention may be a rear end of the left portion of the right lower arm, or a rear end of the left portion of the right upper arm. It is sufficient that the rear end of the left portion of the right arm mechanism be the rear end of the left portion of the right lower arm or the rear end of the left portion of the right upper arm which is disposed rearmost in the front-back direction of the vehicle body.

The steering shaft of the present invention may be formed of a single member. The steering shaft may include a plurality of steering shaft members having different rotary axes. The steering shaft may include a plurality of steering shaft members having the same rotary axis.

The power unit of the present invention may include an electric motor. The power unit may include a hydraulic motor. The power unit may include a speed reduction mechanism. The power unit may not include the speed reduction mechanism. The power unit may include a hydraulic cylinder. The power unit may include a link mechanism connected to the hydraulic cylinder.

The speed reduction mechanism of the present invention may be a gear speed reduction mechanism which includes a plurality of gears. The gear may be a spur gear. The gear may be a helical gear. The gear may be a worm gear. Further, the speed reduction mechanism may be a link mechanism. A form of the speed reduction mechanism is not limited to the above-mentioned form.

The leaning drive mechanism of the present invention may assist a leaning operation of the vehicle body, the left steerable front wheel and the right steerable front wheel performed by a rider by applying a swinging force which causes the left arm mechanism and the right arm mechanism to swing with respect to the vehicle body. The term "assist" may include a case of amplifying a leaning operation. The term "assist" may include a case of suppressing a leaning operation. Further, the leaning drive mechanism of the present invention may control the leaning operation of the vehicle body, the left steerable front wheel and the right steerable front wheel by applying a swinging force which causes the left arm mechanism and the right arm mechanism to swing with respect to the vehicle body irrespective of the leaning operation of the vehicle body, the left steerable front wheel and the right steerable front wheel performed by a rider. For example, when the leaning vehicle is a self-driving vehicle, a swinging force which is controlled in response to an input of various kinds of sensors may be applied to the vehicle body. The leaning drive mechanism of the present invention has no limit based on the purpose for applying the driving force.

The drive connection portion of the present invention may be connected to the left arm mechanism or the right arm mechanism. It is sufficient for the drive connection portion of the present invention to be connected to at least any one of the left arm mechanism, the right arm mechanism or the left-right arm connection mechanism.

A rotation in the present invention is not limited to a movement of a specific rotational angle. The rotation in the present invention may be a rotation of 360° or more. The rotation in the present invention may be a rotation of less than 360°. The rotation in the present invention may be a rotation of less than 180°. The rotation in the present invention may be a rotation of less than 90°.

Swinging in the present invention is not limited to a movement of a specific swing angle. The swing angle in the present invention may be less than 360°. A swing angle in the present invention may be less than 180°. The swing angle in the present invention may be less than 90°.

A connection in the present invention is not limited to a direct connection. The connection in the present invention may be an indirect connection. The indirect connection means a connection of two members by way of a member other than the two members.

Terms and expressions used in this specification are used for the purpose of description, and are not used for the purpose of limiting interpretation. Any feature equivalent to the characteristic feature disclosed and described in this specification is not excluded, and it should be recognized that various modifications which fall within the scope of Claims of the present invention are included in the present invention. The present invention can be embodied in many different embodiments. This disclosure should be construed to provide principle embodiments of the present invention. These embodiments are described in this specification with the understanding that these embodiments do not intend to limit the present invention to preferable embodiments described and/or illustrated in this specification. The present invention is not limited to the embodiments described in this specification. The present invention also includes any embodiment including an equivalent element, modification, deletion, combination, improvement and/or a change which can be recognized by those who are skilled in the art based on this disclosure. A claim limitation should be broadly construed based on a term used in claim, and should not be limited to the embodiments described in this specification or in the prosecution of the present application.

REFERENCE SIGNS LIST 1 leaning vehicle
5 vehicle body
10 head pipe
11L left steerable front wheel
11R right steerable front wheel
20 steering shaft
30L left arm mechanism
30R right arm mechanism
33 leaning drive mechanism
60 steering mechanism
61 leaning mechanism
H1L first left axis
H1R first right axis
H2 second left axis, second right axis

What is claimed is:
1. A leaning vehicle, comprising:
a vehicle body capable of leaning in a left-right direction of the leaning vehicle;
a rear wheel supported by the vehicle body;
a left arm mechanism
that is disposed at a left side of the vehicle body in the left-right direction of the vehicle body,
that has a right portion that is supported by the vehicle body in a swingable manner in an up-down direction of the vehicle body corresponding to a lean of the vehicle body, and
that has a left portion;
a left steerable front wheel that is disposed at a front side of the rear wheel in a front-back direction of the vehicle body, and that is steerably supported by the left portion of the left arm mechanism;
a right arm mechanism
that is disposed at a right side of the vehicle body in the left-right direction of the vehicle body,
that has a left portion that is supported by the vehicle body in a swingable manner in the up-down direction of the vehicle body corresponding to the lean of the vehicle body, and
that has a right portion;
a right steerable front wheel disposed at the front side of the rear wheel in the front-back direction of the vehicle body, and being steerably supported by the right portion of the right arm mechanism;
a leaning mechanism
that includes a left-right arm connection mechanism which connects the left arm mechanism and the right arm mechanism with each other, and which has a damping action for damping swinging of the left arm mechanism and the right arm mechanism in the up-down direction of the vehicle body,
that causes the vehicle body, the left steerable front wheel and the right steerable front wheel to lean leftward of the vehicle with turning of the vehicle to the left, and
that causes the vehicle body, the left steerable front wheel and the right steerable front wheel to lean rightward of the vehicle with turning of the vehicle to the right;
a leaning drive mechanism
that is disposed at a center portion of the vehicle body in the left-right direction,
that is disposed between the vehicle body and any one of the left-right arm connection mechanism, the left arm mechanism or the right arm mechanism, and
that is configured to apply a swinging force which causes the left arm mechanism and the right arm mechanism to swing in the up-down direction of the vehicle body; and
a steering mechanism including
a steering shaft that is rotatably supported by the vehicle body;
a rotary member that is disposed at a lower portion of the steering shaft and that rotates together with the steering shaft; and
a tie rod that is mounted on the rotary member and that is configured to be displaceable in the left-right direction of the vehicle body, the steering mechanism causing the left steerable front wheel and the right steerable front wheel to be steered with the rotation of the steering shaft,
wherein the steering shaft is disposed at the center portion of the vehicle body in the left-right direction, and has an upper end and a lower end, the lower end of the steering shaft being disposed at a front side of the upper end of the steering shaft in the front-back direction of the vehicle body, and the upper end of the steering shaft being disposed at a rear side of a rear end of the right portion of the left arm mechanism and a rear end of the left portion of the right arm mechanism in the front-back direction of the vehicle body,
wherein the lower end of the steering shaft is disposed at a rear side of a front end of the right portion of the left arm mechanism and a front end of the left portion of the right arm mechanism in the front-back direction of the vehicle body, and the lower end of the steering shaft is disposed at a front side of a rear end of the right portion of the left arm mechanism and a rear end of the left portion of the right arm mechanism in the front-back direction of the vehicle body, and
wherein the leaning drive mechanism is disposed at the center portion of the vehicle body in the left-right direction, has a rear end that is disposed at a rear side of the lower end of the steering shaft in the front-back direction of the vehicle body, and has a front end that is disposed at a front side of the upper end of the steering shaft in the front-back direction of the vehicle body, and wherein at least a portion of the leaning drive mechanism is disposed, in the up-down direction of the vehicle body, at a down side of the steering shaft, at a down side of an upper end of the left arm mechanism, and at a down side of an upper end of the right arm mechanism.

2. The leaning vehicle according to claim 1, wherein the leaning drive mechanism includes a power source having a rear end disposed at the rear side of the rear end of the right portion of the left arm mechanism and the rear end of the left portion of the right arm mechanism in the front-back direction of the vehicle body.

3. The leaning vehicle according to claim 1, wherein the leaning drive mechanism includes a speed reduction mechanism having a rear end disposed at the rear side of the rear end of the right portion of the left arm mechanism and the rear end of the left portion of the right arm mechanism in the front-back direction of the vehicle body.

4. The leaning vehicle according to claim 1, wherein the leaning drive mechanism includes a power source having a rear end disposed at a rear side of the upper end of the steering shaft in the front-back direction of the vehicle body.

5. The leaning vehicle according to claim 1,
wherein the leaning drive mechanism includes a power source,
wherein the steering shaft includes a first steering shaft, and a second steering shaft disposed at a front side of the first steering shaft in the front-back direction of the vehicle body, and
wherein the power source has a rear end disposed at a rear side of an upper end of the second steering shaft in the front-back direction of the vehicle body.

6. The leaning vehicle according to claim 1,
wherein the leaning drive mechanism includes a drive connection portion connected to at least any one of the left arm mechanism, the right arm mechanism and the left-right arm connection mechanism for transmitting a swinging force, and
wherein the drive connection portion has a front end disposed at the front side of the rear end of the right portion of the left arm mechanism and the rear end of the left portion of the right arm mechanism in the front-back direction of the vehicle body.

7. The leaning vehicle according to claim 1,
wherein the leaning drive mechanism includes a drive connection portion connected to at least any one of the left arm mechanism, the right arm mechanism and the left-right arm connection mechanism for transmitting a swinging force, and
wherein the drive connection portion has a front end disposed at a front side of the lower end of the steering shaft in the front-back direction of the vehicle body.

8. The leaning vehicle according to claim 1,
wherein the leaning drive mechanism includes a drive connection portion connected to at least any one of the left arm mechanism, the right arm mechanism and the left-right arm connection mechanism for transmitting a swinging force, and
wherein the drive connection portion has a front end disposed at the rear side of the front end of the right portion of the left arm mechanism and the front end of the left portion of the right arm mechanism in the front-back direction of the vehicle body.

9. The leaning vehicle according to claim 1, wherein the leaning mechanism is made of different elements from elements included in the leaning drive mechanism.

10. The leaning vehicle according to claim 1, wherein the leaning mechanism alone causes the vehicle body, the left steerable front wheel and the right steerable front wheel to lean leftward of the vehicle with turning of the vehicle to the left, and causes the vehicle body, the left steerable front wheel and the right steerable front wheel to lean rightward of the vehicle with turning of the vehicle to the right.

11. The leaning vehicle according to claim 1, wherein in the up-down direction of the vehicle body, a position of the steering shaft overlaps a position of the leaning mechanism.

12. The leaning vehicle according to claim 1,
wherein the leaning drive mechanism includes a drive source; and
wherein at least a portion of the drive source is disposed at the down side of the upper end of the left arm mechanism and the upper end of the right arm mechanism in the up-down direction of the vehicle body.

13. The leaning vehicle according to claim 1,
wherein the leaning drive mechanism includes a drive source; and
wherein at least a portion of the drive source is disposed at the rear side of the lower end of the steering shaft in the front-back direction of the vehicle body.

14. The leaning vehicle according to claim 1, wherein at least a portion of the leaning drive mechanism is at a rear side of the left-right arm connection mechanism in the front-back direction of the vehicle body.

15. The leaning vehicle according to claim 14,
wherein the leaning drive mechanism includes a drive source; and
wherein at least a portion of the drive source is disposed at a rear side of the left-right arm connection mechanism in the front-back direction of the vehicle body.

16. A leaning vehicle, comprising:
a vehicle body capable of leaning in a left-right direction of the leaning vehicle;
a rear wheel supported by the vehicle body;
a left arm mechanism
that is disposed at a left side of the vehicle body in the left-right direction of the vehicle body,
that has a right portion that is supported by the vehicle body in a swingable manner in an up-down direction of the vehicle body corresponding to a lean of the vehicle body, and
that has a left portion;
a left steerable front wheel that is disposed at a front side of the rear wheel in a front-back direction of the vehicle body, and that is steerably supported by the left portion of the left arm mechanism;
a right arm mechanism
that is disposed at a right side of the vehicle body in the left-right direction of the vehicle body, that
has a left portion that is supported by the vehicle body in a swingable manner in the up-down direction of the vehicle body corresponding to the lean of the vehicle body, and
that has a right portion;
a right steerable front wheel disposed at the front side of the rear wheel in the front-back direction of the vehicle body, and being steerably supported by the right portion of the right arm mechanism;
a leaning mechanism that includes a left-right arm connection mechanism which connects the left arm mechanism and the right arm mechanism with each other, and which has a damping action for damping swinging of the left arm mechanism and the right arm mechanism in the up-down direction of the vehicle body, that causes the vehicle body, the left steerable front wheel and the right steerable front wheel to lean leftward of the vehicle with turning of the vehicle to the left, and that causes the vehicle body, the left steerable front wheel and the right steerable front wheel to lean rightward of the vehicle with turning of the vehicle to the right;

a leaning drive mechanism that is disposed at a center portion of the vehicle body in the left-right direction, that is disposed between the vehicle body, and any one of the left-right arm connection mechanism, the left arm mechanism or the right arm mechanism, and that is configured to apply a swinging force which causes the left arm mechanism and the right arm mechanism to swing in the up-down direction of the vehicle body; and a steering mechanism including a steering shaft that is rotatably supported by the vehicle body;

a rotary member that is disposed at a lower portion of the steering shaft and that rotates together with the steering shaft; and a tie rod that is mounted on the rotary member and that is configured to be displaceable in the left-right direction of the vehicle body, the steering mechanism causing the left steerable front wheel and the right steerable front wheel to be steered with the rotation of the steering shaft, wherein the steering shaft is disposed at the center portion of the vehicle body in the left-right direction, and has an upper end and a lower end, the lower end of the steering shaft being disposed at a front side of the upper end of the steering shaft in the front-back direction of the vehicle body, and the upper end of the steering shaft being disposed at a rear side of a rear end of the right portion of the left arm mechanism and a rear end of the left portion of the right arm mechanism in the front-back direction of the vehicle body, wherein the lower end of the steering shaft is disposed at a rear side of a front end of the right portion of the left arm mechanism and a front end of the left portion of the right arm mechanism in the front-back direction of the vehicle body, and the lower end of the steering shaft is disposed at a front side of a rear end of the right portion of the left arm mechanism and a rear end of the left portion of the right arm mechanism in the front-back direction of the vehicle body, wherein the leaning drive mechanism is disposed at the center portion of the vehicle body in the left-right direction, has a rear end that is disposed at a rear side of the lower end of the steering shaft in the front-back direction of the vehicle body, and has a front end that is disposed at a front side of the upper end of the steering shaft in the front-back direction of the vehicle body, and at least a portion of the leaning drive mechanism is disposed at a down side of the steering shaft in the up-down direction of the vehicle body, and wherein the leaning drive mechanism includes a speed reduction mechanism having a rear end disposed at a rear side of the upper end of the steering shaft in the front-back direction of the vehicle body.

17. A leaning vehicle, comprising:

a vehicle body capable of leaning in a left-right direction of the leaning vehicle;

a rear wheel supported by the vehicle body;

a left arm mechanism that is disposed at a left side of the vehicle body in the left-right direction of the vehicle body, that has a right portion that is supported by the vehicle body in a swingable manner in an up-down direction of the vehicle body corresponding to a lean of the vehicle body, and that has a left portion;

a left steerable front wheel that is disposed at a front side of the rear wheel in a front-back direction of the vehicle body, and that is steerably supported by the left portion of the left arm mechanism;

a right arm mechanism that is disposed at a right side of the vehicle body in the left-right direction of the vehicle body, that has a left portion that is supported by the vehicle body in a swingable manner in the up-down direction of the vehicle body corresponding to the lean of the vehicle body, and that has a right portion;

a right steerable front wheel disposed at the front side of the rear wheel in the front-back direction of the vehicle body, and being steerably supported by the right portion of the right arm mechanism;

a leaning mechanism that includes a left-right arm connection mechanism which connects the left arm mechanism and the right arm mechanism with each other, and which has a damping action for damping swinging of the left arm mechanism and the right arm mechanism in the up-down direction of the vehicle body, that causes the vehicle body, the left steerable front wheel and the right steerable front wheel to lean leftward of the vehicle with turning of the vehicle to the left, and that causes the vehicle body, the left steerable front wheel and the right steerable front wheel to lean rightward of the vehicle with turning of the vehicle to the right;

a leaning drive mechanism that is disposed at a center portion of the vehicle body in the left-right direction, that is disposed between the vehicle body, and any one of the left-right arm connection mechanism, the left arm mechanism or the right arm mechanism, and that is configured to apply a swinging force which causes the left arm mechanism and the right arm mechanism to swing in the up-down direction of the vehicle body; and a steering mechanism including a steering shaft that is rotatably supported by the vehicle body;

a rotary member that is disposed at a lower portion of the steering shaft and that rotates together with the steering shaft; and a tie rod that is mounted on the rotary member and that is configured to be displaceable in the left-right direction of the vehicle body, the steering mechanism causing the left steerable front wheel and the right steerable front wheel to be steered with the rotation of the steering shaft, wherein the steering shaft is disposed at the center portion of the vehicle body in the left-right direction, and has an upper end and a lower end, the lower end of the steering shaft being disposed at a front side of the upper end of the steering shaft in the front-back direction of the vehicle body, and the upper end of the steering shaft being disposed at a rear side of a rear end of the right portion of the left arm mechanism and a rear end of the left portion of the right arm mechanism in the front-back direction of the vehicle body, wherein the lower end of the steering shaft is disposed at a rear side of a front end of the right portion of the left arm mechanism and a front end of the left portion of the right arm mechanism in the front-back direction of the vehicle body, and the lower end of the steering shaft is disposed at a front side of a rear end of the right portion of the left arm mechanism and a rear end of the left portion of the right arm mechanism in the front-back direction of the vehicle body, wherein the leaning drive mechanism is disposed at the center portion of the vehicle body in the left-right direction, has a rear end that is disposed at a rear side of the lower end of the steering shaft in the front-back direction of the vehicle body, and has a front end that is disposed at a front side of the upper end of the steering shaft in the front-back direction of the vehicle body, and at least a portion of the leaning drive mechanism is disposed at a down side of the steering shaft in the up-down direction of the vehicle body, wherein the leaning drive mechanism includes a speed reduction mechanism, wherein the steering shaft includes a first steering shaft, and a second steering shaft disposed at a front side of the first steering shaft in the front-back direction of the vehicle body, and wherein the speed reduction mechanism has a rear end disposed at a rear side of an upper end of the second steering shaft in the front-back direction of the vehicle body.

* * * * *